US011325605B2

(12) United States Patent
Naiki et al.

(10) Patent No.: US 11,325,605 B2
(45) Date of Patent: May 10, 2022

(54) INFORMATION PROVIDING DEVICE, INFORMATION PROVIDING METHOD, AND STORAGE MEDIUM

(71) Applicant: HONDA MOTOR CO., LTD., Tokyo (JP)

(72) Inventors: Kengo Naiki, Wako (JP); Sawako Furuya, Wako (JP); Yoshifumi Wagatsuma, Wako (JP); Mototsugu Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 16/826,499

(22) Filed: Mar. 23, 2020

(65) Prior Publication Data
US 2020/0317209 A1 Oct. 8, 2020

(30) Foreign Application Priority Data
Mar. 27, 2019 (JP) .............................. JP2019-060022

(51) Int. Cl.
*B60W 40/08* (2012.01)
*G06K 9/00* (2022.01)
(52) U.S. Cl.
CPC ......... *B60W 40/08* (2013.01); *G06K 9/00838* (2013.01); *B60W 2040/0881* (2013.01); *B60W 2540/01* (2020.02)
(58) Field of Classification Search
CPC ............. B60W 40/08; B60W 2540/01; B60W 2040/0881

USPC ............................................................ 701/1
See application file for complete search history.

(56) References Cited

U.S. PATENT DOCUMENTS

| 7,813,822 | B1 * | 10/2010 | Hoffberg ........... H04N 21/44222 700/94 |
| 8,316,237 | B1 * | 11/2012 | Felsher ................ H04L 9/0825 713/171 |
| 8,572,649 | B1 * | 10/2013 | Gossweiler, III .. H04N 21/4828 725/39 |
| 9,147,296 | B2 * | 9/2015 | Ricci ..................... A61B 5/7405 |
| 9,317,983 | B2 * | 4/2016 | Ricci ..................... A61B 5/0077 |
| 10,210,166 | B2 * | 2/2019 | Alten ................. G06F 16/9535 |
| 10,219,144 | B1 * | 2/2019 | Rahman ................ H04M 15/84 |
| 10,789,041 | B2 * | 9/2020 | Kim ........................ G10L 15/20 |
| 11,040,619 | B1 * | 6/2021 | Martin ..................... G06N 3/08 |
| 11,087,571 | B2 * | 8/2021 | Oesterling ........... G07C 5/0866 |

(Continued)

FOREIGN PATENT DOCUMENTS

JP  2004054883 A  *  2/2004
JP  2006-335231     12/2006

(Continued)

*Primary Examiner* — Tuan C To
(74) *Attorney, Agent, or Firm* — Amin, Turocy & Watson, LLP

(57) ABSTRACT

An information providing device of an embodiment is an information providing device including an acquirer that acquires personal information of a plurality of occupants in a moving body, a processor that generates integrated personal information by combining at least a part of the personal information of the plurality of occupants acquired by the acquirer, and an information provider that provides information to the plurality of occupants based on the integrated personal information processed by the processor.

9 Claims, 13 Drawing Sheets

(56) References Cited

U.S. PATENT DOCUMENTS

| | | | |
|---|---|---|---|
| 11,106,218 B2* | 8/2021 | Levinson | B60Q 9/008 |
| 2009/0165090 A1* | 6/2009 | Glasgow | H04L 51/36 |
| | | | 726/3 |
| 2011/0153759 A1* | 6/2011 | Rathod | G06F 3/0482 |
| | | | 709/206 |
| 2013/0134730 A1* | 5/2013 | Ricci | G06F 16/24 |
| | | | 296/24.34 |
| 2014/0122714 A1* | 5/2014 | Jung | G06F 21/6254 |
| | | | 709/225 |
| 2014/0136422 A1* | 5/2014 | Jung | G06Q 10/101 |
| | | | 705/74 |
| 2014/0306814 A1* | 10/2014 | Ricci | G01C 21/3667 |
| | | | 340/425.5 |
| 2014/0309790 A1* | 10/2014 | Ricci | H04L 67/10 |
| | | | 700/276 |
| 2015/0161190 A1* | 6/2015 | Ariel | G06F 16/285 |
| | | | 707/609 |
| 2016/0269456 A1* | 9/2016 | Ricci | B60K 35/00 |
| 2016/0269469 A1* | 9/2016 | Ricci | H04L 67/025 |
| 2017/0247000 A1* | 8/2017 | Ricci | B60R 16/037 |
| 2018/0336045 A1* | 11/2018 | Badr | G06N 3/006 |
| 2019/0392107 A1* | 12/2019 | Ricci | H05K 3/0005 |
| 2020/0067786 A1* | 2/2020 | Ricci | G06F 3/0488 |
| 2021/0344788 A1* | 11/2021 | Cho | H04M 1/72427 |

FOREIGN PATENT DOCUMENTS

| | | | | | |
|---|---|---|---|---|---|
| JP | 2008203217 | A | * | 9/2008 | |
| JP | 4258607 | B2 | * | 4/2009 | |
| WO | WO-2015029296 | A1 | * | 3/2015 | G10L 15/22 |

* cited by examiner

| USER ID | PROFILE INFORMATION | | | | | | |
|---|---|---|---|---|---|---|---|
| | FEATURE INFORMATION | NAME | ADDRESS | AGE | HOBBY | PREFERENCE | USE HISTORY |
| U1 | *** | *** | *** | 25 | ·DRIVE<br>·MUSIC APPRECIATION<br>·DINING OUT | ·POP MUSIC<br>·CHINESE FOOD | ·REPRODUCE MUSIC<br>·SEARCH FOR DRIVER COURSE |
| U2 | *** | *** | *** | 35 | ·DINING OUT<br>·MUSIC APPRECIATION | ·ITALIAN<br>·CLASSIC MUSIC | ·SEARCH FOR RESTAURANT |
| U3 | *** | *** | *** | 46 | ·GOLF<br>·READING | ·ALCOHOL<br>·ETECTIVE NOVEL | ·SEARCH FOR GOLF COURSE ROUTE |
| ⋮ | ⋮ | ⋮ | ⋮ | ⋮ | ⋮ | ⋮ | ⋮ |

| PASSENGER INFORMATION | SEATING POSITION INFORMATION | INTEGRATED PROFILE INFORMATION | | | |
|---|---|---|---|---|---|
| | | INTEGRATED HOBBY | INTEGRATED PREFERENCE | INTEGRATED USE HISTORY | ⋮ |
| U1, U2 | U1···DRIVER SEAT<br>U2···ASSIST SEAT | \<DRIVE*w1\>,<br>\<MUSIC APPRECIATION*(w1+w2)\>,<br>\<DINING OUT*(w1+w2)\> | \<POP MUSIC*w1\>,<br>\<CHINESE FOOD*w1\>,<br>\<ITALIAN*w2\> | \<REPRODUCE MUSIC*w1\>,<br>\<SEARCH FOR DRIVER COURSE*w1\>,<br>\<SEARCH FOR RESTAURANT*w2\> | ⋮ |

INFORMATION PROVIDING DEVICE, INFORMATION PROVIDING METHOD, AND STORAGE MEDIUM

Priority is claimed on Japanese Patent Application No. 2019-060022, filed Mar. 27, 2019, the content of which is incorporated herein by reference.

BACKGROUND

Field of the Invention

The present invention relates to an information providing device, an information providing method, and a storage medium.

Description of Related Art

In the related art, there has been disclosed a technology related to an agent function of providing information on driving assistance, control of a vehicle, other applications and the like according to a request of an occupant of the vehicle while interacting with the occupant (for example, see Japanese Unexamined Patent Application, First Publication No. 2006-335231). Furthermore, Patent Document 1 discloses a technology in which, when there are a plurality of passengers, an agent character displayed on a display means in a driver seat is also displayed on a display means of a passenger seat or a rear seat.

SUMMARY

However, in the aforementioned technology, when responding to the plurality of passengers in the vehicle, no consideration is given to which passenger is to be responded to. Therefore, it may not be possible to send an appropriate response to a user.

The present invention is achieved in view of the problems described above, and one object of the present invention is to provide an information providing device, an information providing method, and a storage medium, by which it is possible to provide more appropriate information to an occupant of a moving body.

Solution to Problem

An information providing device, an information providing method, and a storage medium according to the invention employ the following configurations.

(1): An information providing device according to an aspect of the invention is an information providing device including an acquirer that acquires personal information of a plurality of occupants in a moving body, a processor that generates integrated personal information by combining at least a part of the personal information of the plurality of occupants acquired by the acquirer, and an information provider that provides information to the plurality of occupants based on the integrated personal information processed by the processor.

(2) In the aspect of the aforementioned (1), the information provider further includes a display controller that controls a display to display an agent image that communicates with the plurality of occupants, and an agent functional unit that provides a service including allowing an output to output a sound response according to sounds of the plurality of occupants, wherein the processor combines at least a part of the personal information of the plurality of occupants based on an area of the display where the agent image is displayed.

(3) In the aspect of the aforementioned (2), the processor changes the degree of influence of the personal information of the occupants included in the integrated personal information, based on a display position of the agent image and respective positions of the plurality of occupants in the moving body.

(4) In the aspect of the aforementioned (3), the processor increases the degree of influence of the personal information of the occupants included in the integrated personal information with respect to an occupant located at a position near the display position of the agent image among the plurality of occupants.

(5) In the aspect of the aforementioned (3), the processor allows the degree of influence of personal information of an occupant, who drives the moving body, among the personal information included in the integrated personal information to be larger than the degree of influence of personal information of other occupants.

(6) In the aspect of the aforementioned (3), the processor changes the ratio of the personal information of the occupants included in the integrated personal information, based on the display position of the agent image and respective positions of the plurality of occupants in the moving body.

(7) In the aspect of the aforementioned (2), the display has a display area large enough for two or more of the plurality of occupants to recognize that the agent image is displayed at a position facing the two or more occupants.

(8) An information providing method according to another aspect of the present invention is an information providing method including acquiring, by an information providing device, personal information of a plurality of occupants in a moving body, generating, by the information providing device, integrated personal information by combining at least a part of the acquired personal information of the plurality of occupants, and providing, by the information providing device, information to the plurality of occupants based on the generated integrated personal information.

(9) A storage medium according to another aspect of the present invention is a computer readable non-transitory storing medium storing a program, which causes an information providing device to perform acquiring personal information of a plurality of occupants in a moving body, generating integrated personal information by combining at least a part of the acquired personal information of the plurality of occupants, and providing information to the plurality of occupants based on the generated integrated personal information.

According to the aspects of (1) to (9), it is possible to provide more appropriate information to an occupant of a moving body.

BRIEF DESCRIPTION OF THE DRAWINGS

FIG. 6 is a diagram illustrating an example of the content of a personal profile.

FIG. 7 is a diagram illustrating an example of the content of an integrated profile.

DESCRIPTION OF EMBODIMENTS

Hereinafter, an embodiment of an information providing device, an information providing method, and a storage medium of the present invention will be described with reference to the drawings.

First Embodiment

In the first embodiment, an agent device is used as an example of an information providing device. The agent device is a device that implements a part or all of an agent system. Hereinafter, as an example of the agent device, an agent device mounted on a vehicle (hereinafter, a vehicle M), which is an example of a moving body, and having a plurality of types of agent functions will be described. In applying the present invention, the agent device does not always have a plurality of types of agent functions, and may be a portable terminal device such as a smart phone; however, in the following description, an agent device mounted on a vehicle and having a plurality of types of agent functions is assumed. The agent function refers to, for example, a function of providing various types of information or controlling various devices based on requests (commands) included in utterance of occupants (an example of users) of the vehicle M or mediating a network service while interacting with the occupants. A plurality of types of agents may differ in functions to be performed, processing procedures, control, and output modes and contents. Some of the agent functions may have a function of performing control and the like of devices in the vehicle (for example, devices related to driving control and vehicle body control).

The agent functions are implemented integrally using a natural language processing function (function of understanding the structure and meaning of a text), a conversation management function, a network search function of searching for other devices via a network or searching for a predetermined database held by own device, and the like, in addition to a sound recognition function of recognizing sounds of occupants (function of converting sounds to texts). Some or all of these functions may be implemented by an artificial intelligence (AI) technology. A part of a configuration for performing these functions (particularly, a sound recognition function and a natural language processing and interpretation function) may be mounted on an agent server (external device) capable of communicating with an in-vehicle communication device of the vehicle M or a general purpose communication device brought into the vehicle M. In the following description, it is assumed that a part of the configuration is mounted on the agent server and the agent device and the agent server implement an agent system in cooperation with each other. A service providing entity (service entity) that virtually appears in cooperation of the agent device and the agent server is referred to as an agent.

<Overall Configuration>

Figure 1:
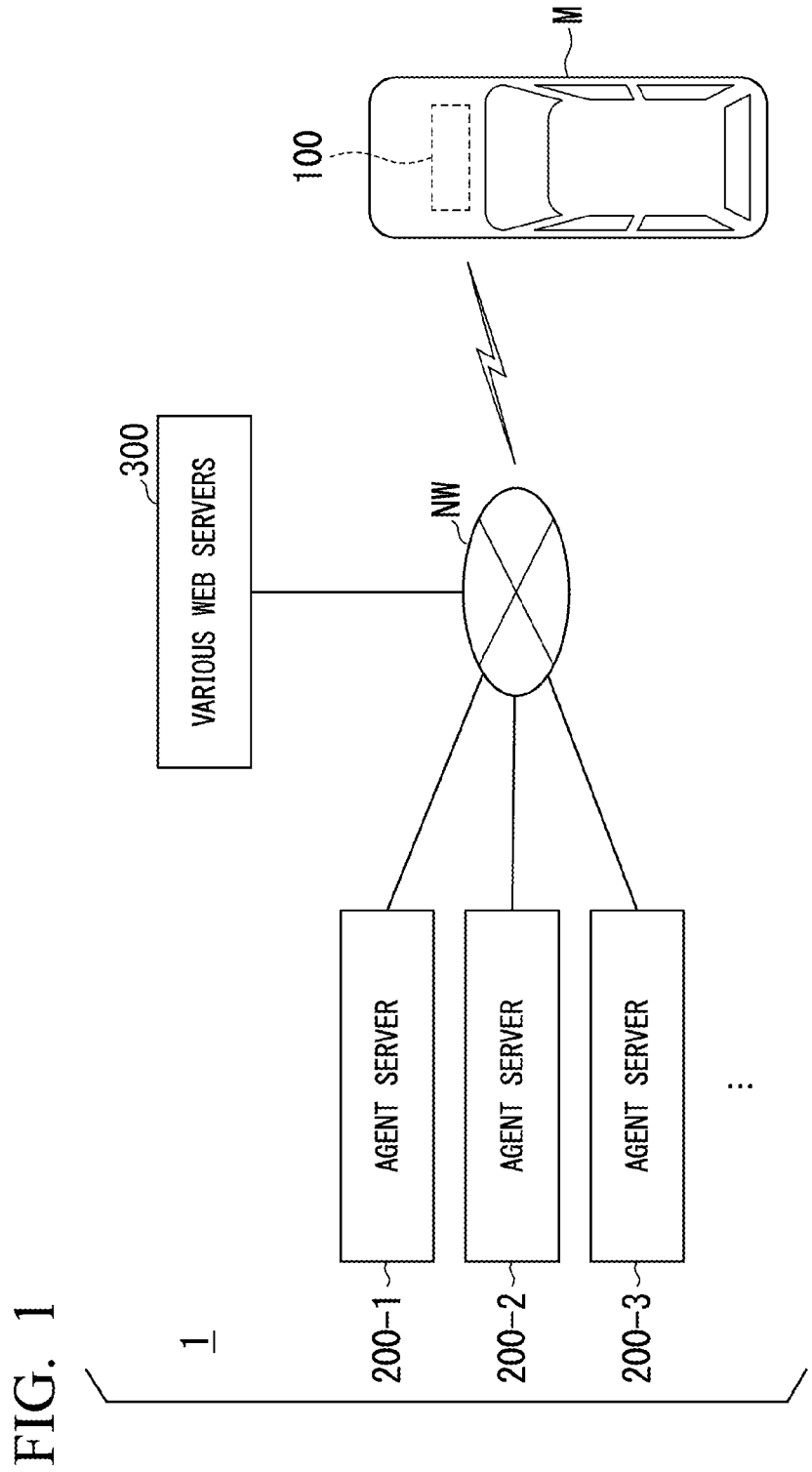
FIG. 1 is a configuration diagram of an agent system including an agent device.

FIG. 1 is a configuration diagram of an agent system 1 including an agent device 100. The agent system 1 includes, for example, the agent device 100, a plurality of agent servers 200-1 to 200-3, . . . . It is assumed that the number following the hyphen at the end of the reference numerals are identifiers for distinguishing agents. When it is not necessary to distinguish between the agent servers, they may be simply referred to as the agent server 200. FIG. 1 illustrates three agent servers 200, but the number of agent servers 200 may be two, or four or more. The agent servers 200 are operated by providers of different agent systems. Consequently, the agents in the present embodiment are agents implemented by different providers. The provider includes, for example, an automobile manufacturer, a network service provider, an electronic commerce provider, a seller or a manufacturer of a portable terminal, and the like, and an arbitrary entity (corporation, organization, individual and the like) may be a provider of the agent system.

The agent device 100 communicates with the agent server 200 via a network NW. The network NW includes, for example, some or all of the Internet, a cellular network, a Wi-Fi network, a wide area network (WAN), a local area network (LAN), a public line, a telephone line, a radio base station, and the like. Various web servers 300 are connected to the network NW, and the agent server 200 or the agent device 100 can acquire web pages from the various web servers 300 via the network NW.

The agent device 100 interacts with the occupants of the vehicle M, transmits sounds of the occupants to the agent server 200, and presents a response obtained from the agent server 200 to the occupants in the form of sound output or image display.

[Vehicle]

Figure 2:
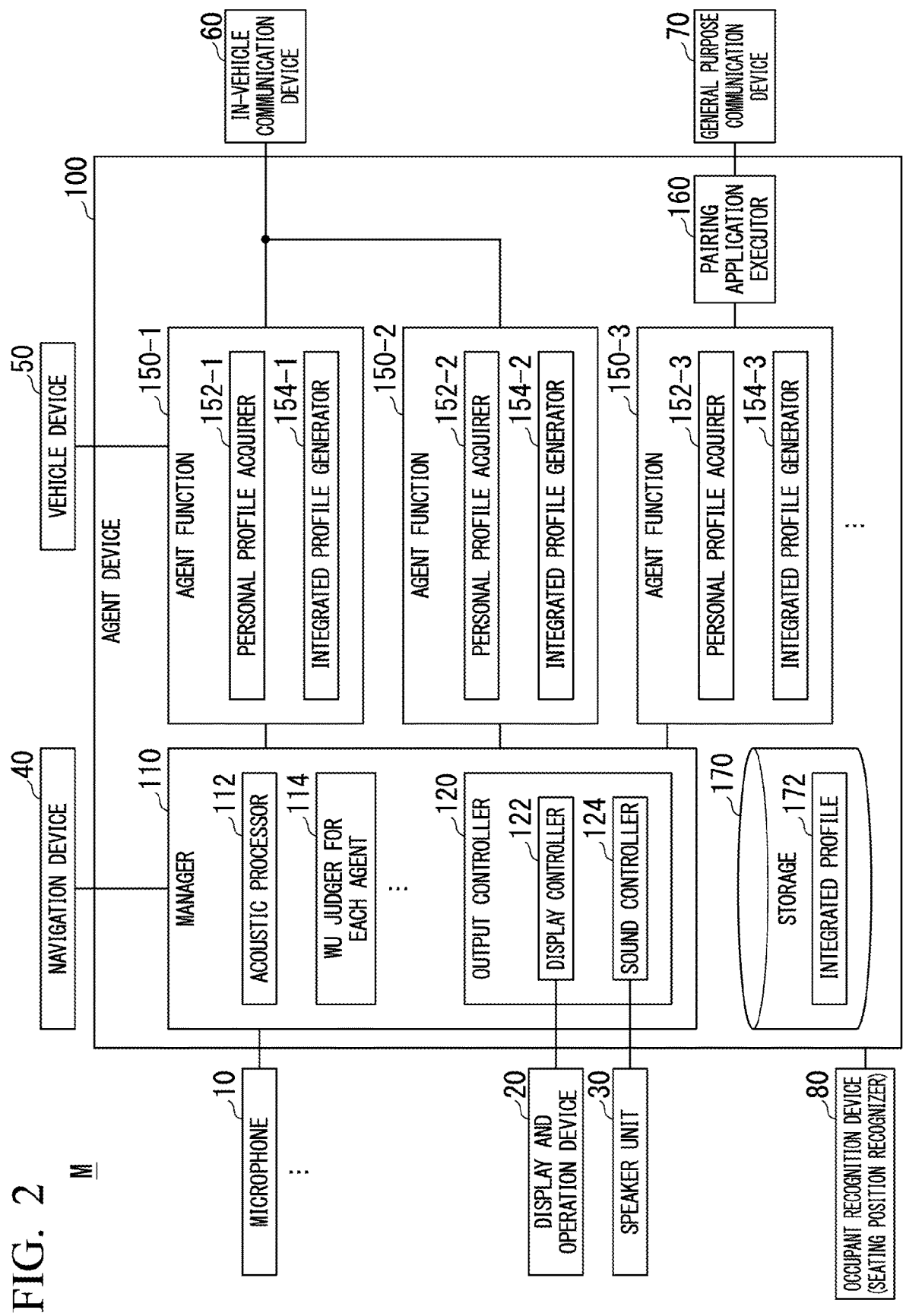
FIG. 2 is a diagram illustrating a configuration of the agent device according to a first embodiment and devices mounted on a vehicle.

FIG. 2 is a diagram illustrating the configuration of the agent device 100 according to the first embodiment and devices mounted on the vehicle M. In the vehicle M, for example, one or more microphones 10, a display and operation device 20, a speaker unit 30, a navigation device 40, a vehicle device 50, an in-vehicle communication device 60, an occupant recognition device 80, and the agent device 100 are mounted. There is a case where a general purpose communication device 70 such as a smart phone is brought into a vehicle interior and is used as a communication device. These devices are mutually connected by a multiplex communication line such as a controller area network (CAN) communication line, a serial communication line, a wireless communication network, and the like. The configuration illustrated in FIG. 2 is merely an example, a part of the configuration may be omitted, or another configuration may be further added. At least one of the display and operation device 20 and the speaker unit 30 is an example of an "output".

The microphone 10 is a sound collector that collects sounds generated inside the vehicle interior. The display and operation device 20 is a device (for example, a device group) capable of displaying an image and receiving an input operation. The display and operation device 20 includes, for example, a display device configured as a touch panel. The display and operation device 20 may further include a head up display (HUD) or a mechanical input device. The speaker unit 30 includes, for example, a plurality of speakers (sound outputs) arranged at different positions in the vehicle interior. The display and operation device 20 may be shared by the agent device 100 and the navigation device 40. Details thereof will be described below.

The navigation device 40 includes a navigation human machine interface (HMI), a location positioning device such as a global positioning system (GPS), a storage device that stores map information, and a control device (navigation controller) that performs route search, and the like. Some or all of the microphone 10, the display and operation device 20, and the speaker unit 30 may be used as a navigation HMI. The navigation device 40 searches for a route (navigation route) for moving to a destination input by an occupant from the position of the vehicle M specified by the location positioning device, and outputs guidance information by using the navigation HMI such that the vehicle M can travel along the route. The route search function may be provided in a navigation server accessible via the network NW. In such a case, the navigation device 40 acquires the route from the navigation server and outputs the guidance information. The agent device 100 may be constructed based on the navigation controller, and in such a case, the navigation controller and the agent device 100 are integrally configured on hardware.

The vehicle device 50 includes, for example, a driving force output device such as an engine and a travel motor, an engine starting motor, a door lock device, a door opening and closing device, a window, an opening and closing device of the window, an opening and closing control device of the window, a seat, a seat position control device, a rearview mirror and its angle position control device, a lighting device inside and outside of the vehicle and its control device, a wiper and defogger and its control device, a direction indicator and its control device, an air conditioner, a vehicle information device of information on a travel distance and tire air pressure, information on remaining fuel, and the like.

The in-vehicle communication device 60 is, for example, a wireless communication device capable of accessing the network NW by using a cellular network or a Wi-Fi network.

The occupant recognition device 80 includes, for example, a seating sensor, a vehicle interior camera, an image recognition device, a sound recognition device, and the like. The seating sensor includes a pressure sensor provided below the seat, a tension sensor attached to a seat belt, and the like. The vehicle interior camera is a charge coupled device (CCD) camera or a complementary metal oxide semiconductor (CMOS) camera provided in the vehicle interior. The image recognition device analyzes an image of the vehicle interior camera, and recognizes information on the presence or absence of an occupant for each seat, orientation of a face, feature information of the face, and the like. The feature information of the face is, for example, information on the skin color, contour shape, arrangement of characteristic parts (eyes, nose, and mouth), and shape of the face. The sound recognition device recognizes sound feature information of each occupant from sounds acquired from the microphone 10 and the like. The sound feature information is, for example, information on feature amounts based on sound pitch, intonation, rhythm (sound pitch pattern), features of one's way speaking such as pose, Mel frequency Cepstrum coefficients, and the like. Based on the intensity of the sounds collected by the plurality of microphones 10, a time difference when the same sound has been collected, and the like, the occupant recognition device 80 may estimate positions, where the sounds have been output, and recognize the seating positions of the occupants from the estimated positions. The occupant recognition device 80 may recognize a speaker from the movement of a mouth obtained from the image and the positions where the sounds have been output. The occupant recognition device 80 may recognize the position on vehicle interior space coordinates where each occupant is seated, in correlation with the aforementioned face and sound feature information. That is, in the present embodiment, the occupant recognition device 80 is an example of a seating position recognizer.

Figure 3:
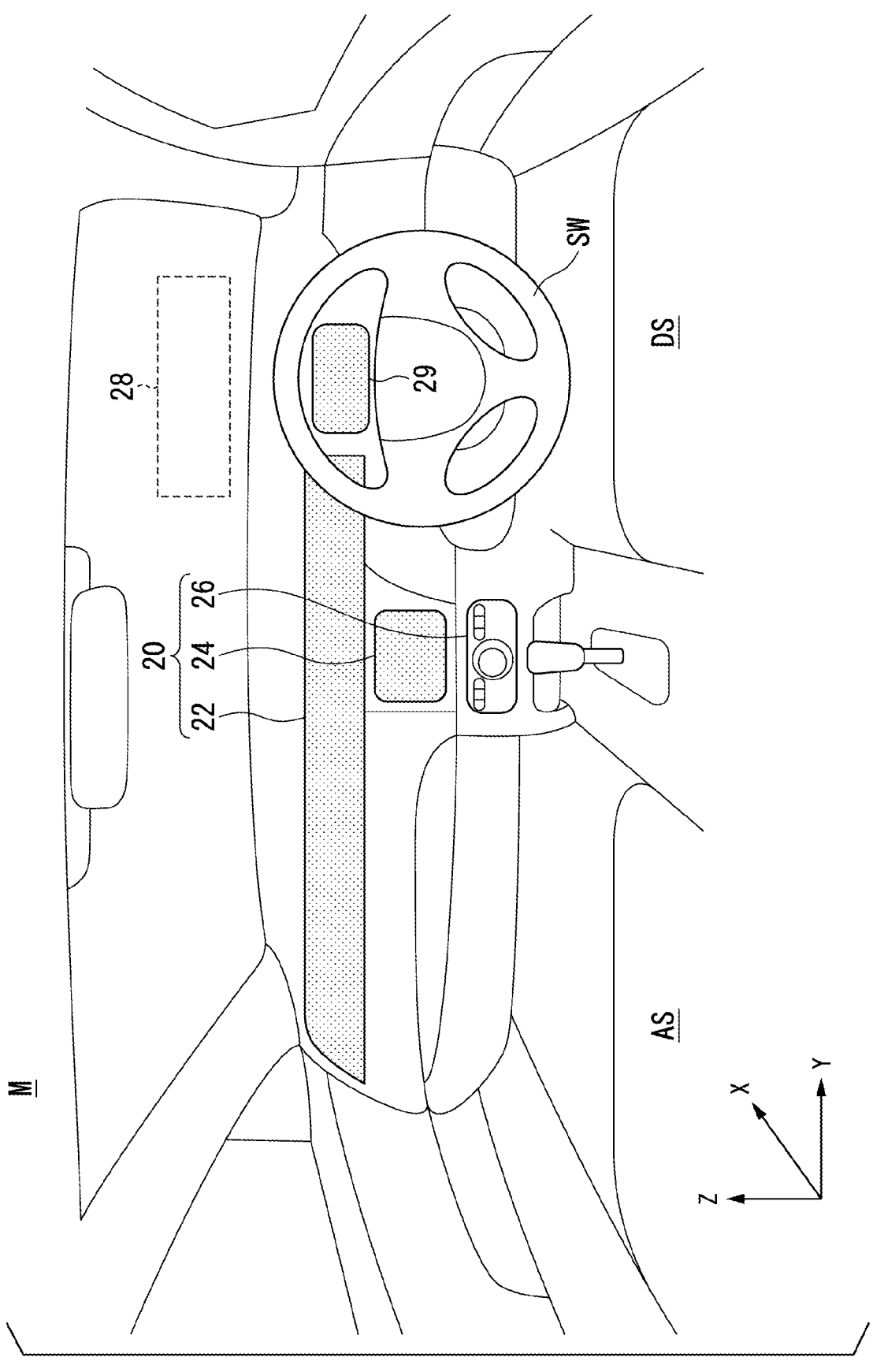
FIG. 3 is a diagram illustrating an arrangement example of a display and operation device.

FIG. 3 is a diagram illustrating an arrangement example of the display and operation device 20. The display and operation device 20 includes, for example, a first display 22, a second display 24, and an operation switch ASSY 26. The display and operation device 20 may further include a HUD 28. The display and operation device 20 may further include a meter display 29 provided on a portion of an installment panel facing a driver seat DS. A combination of some or all of the first display 22, the second display 24, the HUD 28, and the meter display 29 is an example of a "display".

The vehicle M includes, for example, the driver seat DS provided with a steering wheel SW and an assistant seat AS provided in a vehicle width direction (Y direction in the drawing) with respect to the driver seat DS. The first display 22 has a wide display area enough for two or more of a plurality of occupants to recognize that an agent image, which will be described below, is displayed at a position facing the occupants. Specifically, the first display 22 is a horizontally long display device extending from the vicinity of the left side of the driver seat DS in the installment panel to a position facing the left end portion of the assistant seat AS. When the meter display 29 is not provided on the vehicle M, the first display 22 may be extended to the vicinity of the right end portion of the driver seat DS, and content, which is to be displayed on the meter display 29 to be described below, may be displayed on an area on the right side (driver seat DS side) when viewed from the front of the first display 22.

The second display 24 is installed at an intermediate position between the driver seat DS and the assistant seat AS in the vehicle width direction, and below the first display. For example, each of the first display 22 and the second display 24 is configured as a touch panel and includes a liquid crystal display (LCD), an organic electroluminescence (EL), a plasma display, and the like as a display. The operation switch ASSY 26 is formed by integrating dial switches, button switches, and the like. The HUD 28 is, for example, a device for visually recognizing an image by superimposing the image on a landscape, and as an example, the HUD 28 projects light including an image on a front windshield or a combiner of the vehicle M, thereby allowing the occupants to visually recognize a virtual image. The meter display 29 is, for example, an LCD, an organic EL, and the like, and displays an instrument such as a speedometer and a tachometer. The display and operation device 20 outputs the content of operations performed by the occupants to the agent device 100. The content displayed by the aforementioned each display may be determined by the agent device 100.

Figure 4:
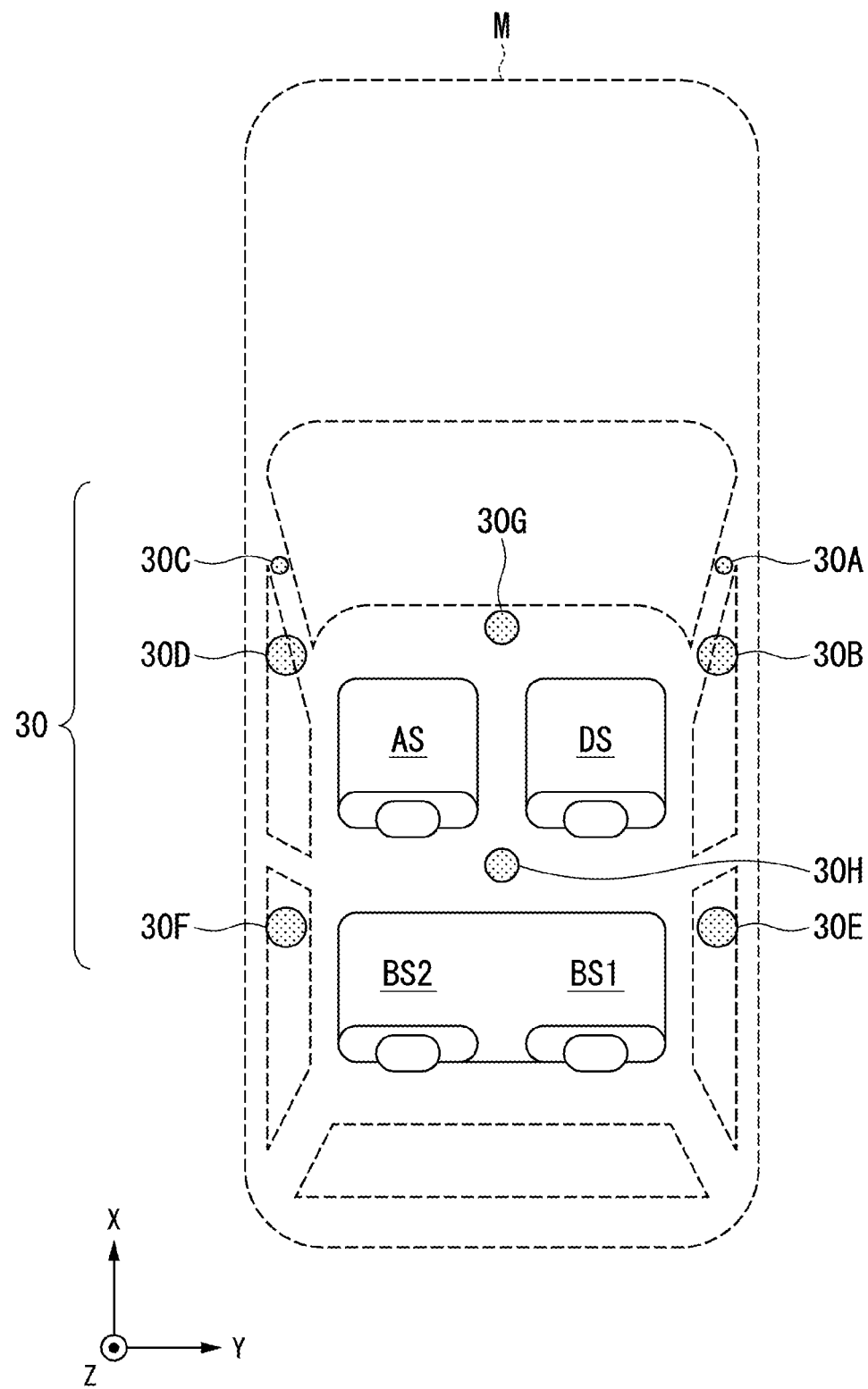
FIG. 4 is a diagram illustrating an arrangement example of a speaker unit.

FIG. 4 is a diagram illustrating an arrangement example of the speaker unit 30. The speaker unit 30 includes, for example, speakers 30A to 30H. The speaker 30A is installed on a window post (so-called a pillar A) on the driver seat DS side. The speaker 30B is installed below a door near the driver seat DS. The speaker 30C is installed on a window post on the assistant seat AS side. The speaker 30D is installed below a door near the assistant seat AS. The speaker 30E is installed below a door near a right rear seat BS1 side. The speaker 30F is installed below a door near a left rear seat BS2 side. The speaker 30G is installed in the vicinity of the second display 24. The speaker 30H is installed on a ceiling (roof) of the vehicle interior.

In such an arrangement, for example, when sounds are exclusively output to the speakers 30A and 30B, a sound image is localized near the driver seat DS. The "localizing the sound image" means, for example, determining a spatial position of a sound source perceived by an occupant by adjusting the loudness of the sounds transferred to the right and left ears of the occupant. When sounds are exclusively output to the speakers 30C and 30D, a sound image is localized near the assistant seat AS. When sounds are exclusively output to the speaker 30E, a sound image is localized near the front of the vehicle interior, and when sounds are exclusively output to the speaker 30F, a sound image is localized near the upper portion of the vehicle interior. When sounds are exclusively output to the speaker 30G, a sound image is localized near the front of the vehicle interior, and when sounds are exclusively output to the speaker 30H, a sound image is localized near the upper portion of the vehicle interior. The present invention is not limited thereto, and the speaker unit 30 can localize a sound image at an arbitrary position in the vehicle interior by adjusting the distribution of sounds output from each speaker by using a mixer or an amplifier.

[Agent Device]

Returning to FIG. 2, the agent device 100 includes a manager 110, agent functions 150-1 to 150-3, a pairing application executor 160, and a storage 170. The manager 110 includes, for example, an acoustic processor 112, a wake-up (WU) judger 114 for each agent, and an output controller 120. Hereinafter, when no distinction is made among the agent functions, they are simply referred to as the agent function 150. The illustration of the three agent functions 150 is merely an example corresponding to the number of agent servers 200 in FIG. 1, and the number of agent functions 150 may be two, or four or more. The software arrangement illustrated in FIG. 2 is simply illustrated for the purpose of description, and can be actually modified arbitrarily such that, for example, the manager 110 may be interposed between the agent function 150 and the in-vehicle communication device 60. Hereinafter, an agent that appears in cooperation of the agent function 150-1 and the agent server 200-1 may be referred to as an "agent 1", an agent that appears in cooperation of the agent function 150-2 and the agent server 200-2 may be referred to as an "agent 2", and an agent that appears in cooperation of the agent function 150-3 and the agent server 200-3 may be referred to as an "agent 3". In the first embodiment, a combination of some or all of the agent function 150 and the output controller 120 is an example of an "information provider".

Each component of the agent device 100 is implemented by, for example, a hardware processor such as a central processor (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processor (GPU), or may be implemented by cooperation of software and hardware. The program may be stored in advance in a storage device (storage device including a non-transitory storage medium) such as an HDD and a flash memory, or may be installed in the HDD and the flash memory when a detachable storage medium (non-transitory storage medium) storing the program, such as a DVD and a CD-ROM, is mounted on a drive device.

The storage 170 is implemented by the aforementioned various storage devices. The storage 170 stores, for example, data such as an integrated profile 172 and programs. The integrated profile 172 is data generated by an integrated profile generator 154 to be described below. Details of the content of the integrated profile 172 will be described below.

The manager 110 functions by executing a program such as an operating system (OS) and middleware.

The acoustic processor 112 of the manager 110 receives the sounds collected from the microphone 10, and performs an acoustic process on the received sounds so that it is brought into a state suitable for recognizing a wake-up word set in advance for each agent. The wake-up word includes, for example, a word, a phrase and the like for activating a target agent. The acoustic process includes, for example, noise removal by filtering of a band pass filter and the like, sound amplification, and the like. The acoustic processor 112 outputs the sounds subjected to the acoustic process to the WU judger 114 for each agent and an activated agent function.

The WU judger 114 for each agent exists in correspondence with each of the agent functions 150-1 to 150-3, and recognizes a wake-up word set in advance for each agent. The WU judger 114 for each agent recognizes the meaning of the sounds from the sounds (sound stream) subjected to the acoustic process. First, the WU judger 114 for each agent detects a sound section based on the amplitude and zero crossing of a sound waveform in the sound stream. The WU judger 114 for each agent may perform section detection based on sound identification and non-sound identification on a frame basis based on a Gaussian mixture model (GMM).

Next, the WU judger 114 for each agent converts the sound in the detected sound section into a text and uses the text as character information. Then, the WU judger 114 for each agent determines whether the character information converted into text corresponds to the wake-up word. When it is determined that the character information is the wake-up word, the WU judger 114 for each agent activates a corresponding agent function 150. A function corresponding to the WU judger 114 for each agent may be provided in the agent server 200. In such a case, the manager 110 transmits the sound stream subjected to the acoustic process by the acoustic processor 112 to the agent server 200, and when the agent server 200 determines that the sound stream is the wake-up word, the manager 110 activates the agent function 150 according to an instruction from the agent server 200. Each agent function 150 may always be activated and may determine the wake-up word by itself. In such a case, the manager 110 needs not include the WU judger 114 for each agent.

When the WU judger 114 for each agent recognizes a termination word included in the uttered sound in a procedure similar to the aforementioned procedure and an agent corresponding to the termination word is in an activated state (hereinafter, referred to as "activated" as needed), the WU judger 114 for each agent terminates (stops) the activated agent function. The activation and termination of the agent may be executed, for example, by receiving a predetermined operation from the display and operation device 20; however, hereinafter, an example of sound activation and stopping by sounds will be described. An activated agent may be stopped when no sound input is received for a predetermined time or more.

The output controller 120 controls the display or the speaker unit 30 such that information on a response result and the like is output according to an instruction from the manager 110 or the agent function 150, thereby providing a service and the like to the occupants. The output controller 120 includes, for example, a display controller 122 and a sound controller 124.

The display controller 122 controls an image to be displayed in a predetermined area of the display according to an instruction from the output controller 120. Hereinafter, a description will be given assuming that the first display 22 displays an agent-related image. The display controller 122 generates, for example, an image of a personified agent (hereinafter, referred to as an agent image) that communicates with the occupants in the vehicle interior, and controls the first display 22 such that the generated agent image is displayed, under the control of the output controller 120. The agent image is, for example, an image in a mode of talking to the occupants. The agent image may include, for example, a face image to the extent that an expression and a face direction are recognized by at least a viewer (occupant). For example, in the agent image, parts simulating eyes and a nose are represented in a face area and an expression and a face direction are recognized based on the positions of the parts in the face area. The agent image is perceived three-dimensionally and includes a head image in a three-dimensional space, so that the face direction of the agent may be recognized by the viewer, or includes an image of a body (torso and limbs), so that the operation, behavior, posture and the like of the agent may be recognized by the viewer. The agent image may be an animation image.

The display controller 122 may, for example, control the agent image to be displayed in a display area near the position of an occupant recognized by the occupant recognition device 80, or perform control such that an agent image in which a face is directed to the position of the occupant is generated and displayed. When a plurality of occupants in the vehicle M are recognized by the occupant recognition device 80, the display controller 122 may move the agent image toward a speaker recognized by the occupant recognition device 80, or may move the agent image to a position visually recognizable from the positions of the plurality of occupants. The display controller 122 may move the agent image to a position specified by an occupant's operation. The occupant's operation includes, for example, an operation in which the occupant touches a display position of the agent image displayed on the first display 22 with his/her finger and slides the touched finger in any direction on a screen, an operation by a gesture of the occupant representing the movement of the agent image in a non-touched state, an operation by sounds instructing the movement of the agent image, and the like. The movement of the agent image includes, for example, movement on the same display (for example, movement from the right to the left on the first display 22), movement between other displays (for example, movement from the first display 22 to the second display 24), and the like.

The sound controller 124 controls some or all of the speakers included in the speaker unit 30 to output sounds according to an instruction from the output controller 120. The sound controller 124 may use a plurality of speaker units 30 and perform control for localizing sound images of agent sounds at a position corresponding to the display position of the agent image. The position corresponding to the display position of the agent image is, for example, a position where an occupant is predicted to perceive that the agent image is uttering agent sounds, and specifically, is a position near the display position of the agent image (for example, within 2 cm to 3 cm).

The agent function 150 provides a service including causing an agent to appear in cooperation with a corresponding agent server 200 and causing the output to output a sound response according to an utterance of the occupant of the vehicle. The agent function 150 may include an agent function to which authority for controlling the vehicle M (for example, the vehicle device 50) has been given. Some of the agent functions 150 may communicate with the agent server 200 in cooperation with the general purpose communication device 70 via the pairing application executor 160. For example, authority for controlling the vehicle M (for example, the vehicle device 50) has been given to the agent function 150-1. The agent function 150-1 communicates with the agent server 200-1 via the in-vehicle communication device 60. The agent function 150-2 communicates with the agent server 200-2 via the in-vehicle communication device 60. The agent function 150-3 communicates with the agent server 200-3 in cooperation with the general purpose communication device 70 via the pairing application executor 160.

The agent function 150-1 includes a personal profile acquirer 152-1 and an integrated profile generator 154-1, the agent function 150-2 includes a personal profile acquirer 152-2 and an integrated profile generator 154-2, and the agent function 150-3 includes a personal profile acquirer 152-3 and an integrated profile generator 154-3. The personal profile acquirer 152 is an example of an "acquirer". The integrated profile generator 154 is an example of a "processor". The personal profile acquirer 152 transmits the occupant recognition result of the occupant recognition device 80 to the agent server 200, and acquires a personal profile of each occupant. The personal profile includes, for example, occupant's personal information, which is stored for each occupant. The personal information includes, for example, feature information derived from an image or sounds, a name, an address, an age, a hobby, a preference, past conversation history, and the like. A specific example of the personal profile will be described below.

The integrated profile generator 154 generates an integrated profile by combining at least a part of the personal profiles of the occupants of the vehicle M, which have been acquired by the personal profile acquirer 152. The integrated profile is an example of "integrated personal information". The integrated profile generator 154 stores the generated integrated profile in the storage 170. Details of the functions of the personal profile acquirer 152 and the integrated profile generator 154 will be described below. The aforementioned personal profile acquirer 152 and integrated profile generator 154 may be provided in the manager 110.

The pairing application executor 160 performs pairing with the general purpose communication device 70 by, for example, Bluetooth (registered trademark), and connects the agent function 150-3 and the general purpose communication device 70. The agent function 150-3 may be connected to the general purpose communication device 70 by wired communication using a universal serial bus (USB) and the like.

[Agent Server]

Figure 5:
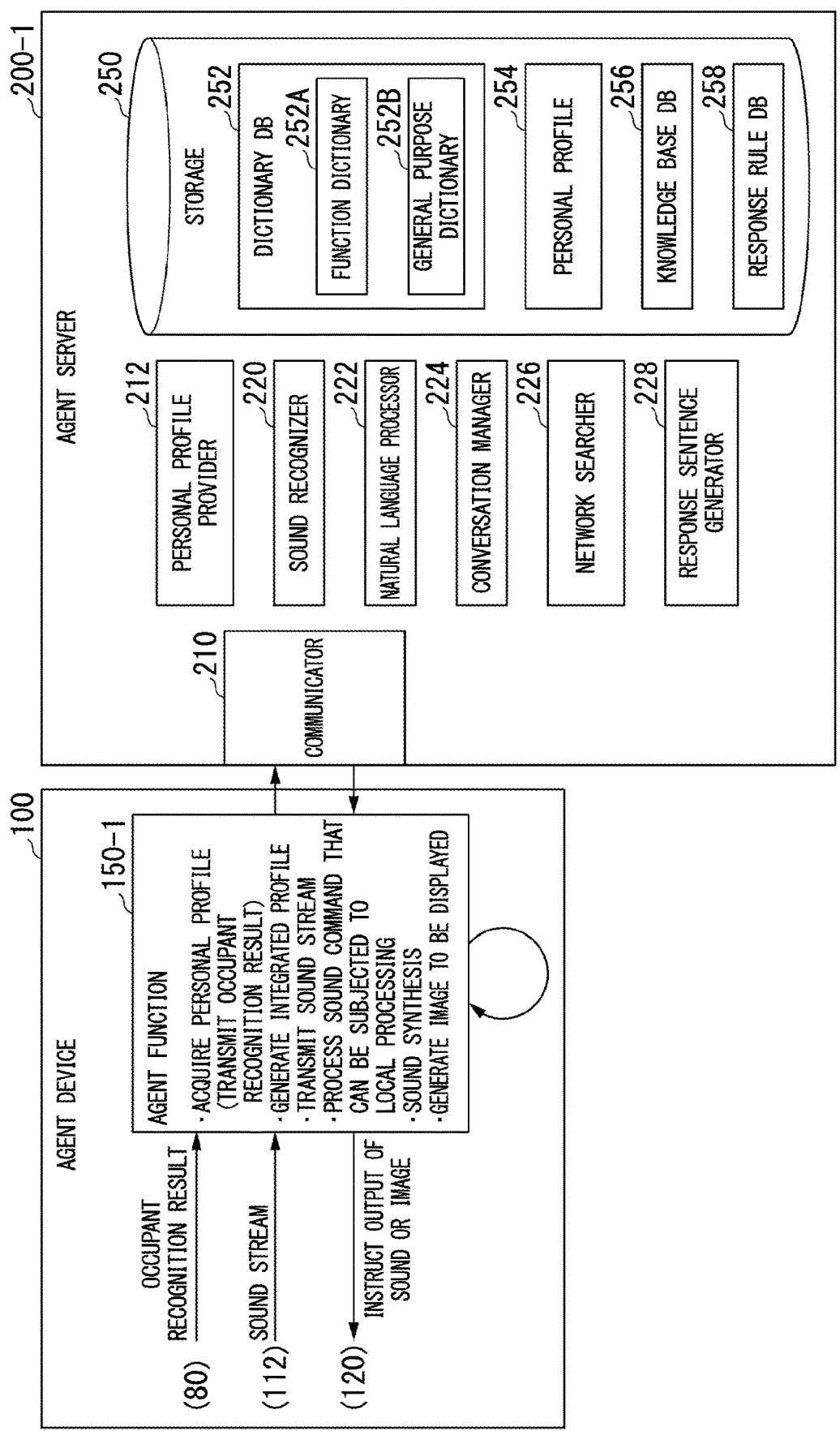
FIG. 5 is a diagram illustrating a configuration of an agent server according to the first embodiment and a part of the configuration of the agent device.

FIG. 5 is a diagram illustrating the configuration of the agent server 200 according to the first embodiment and a part of the configuration of the agent device 100. Hereinafter, operations of the agent function 150 and the like will be described together with the configuration of the agent server 200. Here, a description for physical communication from the agent device 100 to the network NW will be omitted. Hereinafter, a description will be given assuming that the agent function 150-1 is activated by the WU judger 114 for each agent and a response to utterances is provided to the occupants by the agent 1 implemented by cooperation of the agent function 150-1 and the agent server 200-1; however, for a pair of another agent function and another agent server, there is a difference in functions, database and the like executable in each of them, but processing is implemented in substantially the same flow.

The agent server 200-1 includes a communicator 210. The communicator 210 is, for example, a network interface such as a network interface card (NIC). Moreover, the agent server 200-1 includes, for example, a personal profile provider 212, a sound recognizer 220, a natural language processor 222, a conversation manager 224, a network searcher 226, a response sentence generator 228, and a storage 250. These components are implemented by, for example, a hardware processor such as a CPU that executes a program (software). Some or all of these components may be implemented by hardware (a circuit unit: including circuitry) such as an LSI, an ASIC, a FPGA, and a GPU, or may be implemented by cooperation of software and hardware. The program may be stored in advance in a storage device (storage device including a non-transitory storage medium) such as an HDD and a flash memory, or may be installed in the HDD and the flash memory when a detachable storage medium (non-transitory storage medium) storing the program, such as a DVD and a CD-ROM, is mounted on a drive device. A combination of the sound recognizer 220 and the natural language processor 222 is an example of a "recognizer".

The storage 250 is implemented by each of the aforementioned storage devices. The storage 250 stores, for example, data and programs such as a dictionary DB 252, a personal profile 254, a knowledge base DB 256, and a response rule DB 258.

The personal profile provider 212 acquires occupant's personal profiles from the personal profile 254 based on the occupant recognition result transmitted by the agent function 150-1, and transmits the acquired occupant's personal profiles to the agent function 150-1. The integrated profile generator 154-1 acquires the occupant's personal profiles transmitted by the agent server 200-1, generates the integrated profile 172 from the acquired occupant's personal profiles, and stores the generated integrated profile 172 in the storage 170.

The agent function 150-1 transmits, for example, the sound stream input from the acoustic processor 112 and the like or a sound stream subjected to processing such as compression and encoding to the agent server 200-1. When it is possible to recognize a command (request content) that can be subjected to local processing (processing not via the agent server 200-1), the agent function 150-1 may perform a process requested by the command. The command that can be subjected to local processing is, for example, a command that can be responded to by referring to the storage 170 included in the agent device 100. More specifically, the command that can be subjected to local processing is, for example, a command that searches for a specific person's name from telephone directory data (not illustrated) existing in the storage 170 and calls a telephone number (calls a partner) correlated with a matching name Consequently, the agent function 150-1 may have some of the functions of the agent server 200-1.

When the sound stream is acquired, the sound recognizer 220 performs sound recognition and outputs character information converted to a text, and the natural language processor 222 performs semantic interpretation on the character information while referring to the dictionary DB 252. The dictionary DB 252 is, for example, a DB in which abstracted semantic information is correlated with the character information. The dictionary DB 252 includes, for example, a function dictionary 252A and a general purpose dictionary 252B. The function dictionary 252A is a dictionary for covering functions provided by the agent 1 implemented by cooperation of the agent server 200-1 and the agent function 150-1. For example, when the agent 1 provides a function of controlling an in-vehicle air conditioner, words such as "air conditioner", "air conditioning", "turn on", "turn off", "temperature", "increase", "decrease", "inside air", and "outside air" are registered in the function dictionary 252A in correlation with word types such as verbs and objects, and abstracted meanings. The function dictionary 252A may include inter-word link information indicating that it can be simultaneously used. The general purpose dictionary 252B is a dictionary in which not only the functions provided by the agent 1 but also events of general things are correlated with abstracted meanings. Each of the function dictionary 252A and the general purpose dictionary 252B may include list information of synonyms. The function dictionary 252A and the general purpose dictionary 252B may be prepared corresponding to each of a plurality of languages, and in such a case, the sound recognizer 220 and the natural language processor 222 use the function dictionary 252A and the general purpose dictionary 252B according to preset language setting, and grammar information (not illustrated). The processing of the sound recognizer 220 and the processing of the natural language processor 222 are not clearly divided into steps, and may be performed while affecting each other such as correction of a recognition result by the sound recognizer 220 after the reception of the processing result of the natural language processor 222.

The natural language processor 222 performs semantic analysis based on the recognition result of the sound recognizer 220. The natural language processor 222 recognizes meanings such as "What is the weather today?" and "What is the weather?" as the recognition result, and generates a command replaced with standard character information "Today's weather". In this way, even when there is a variation in characters in a request sound, it is possible to easily perform a requested conversation. For example, the natural language processor 222 may recognize the meaning of the character information by using artificial intelligent processing such as machine learning processing using probability, or generate a command based on a recognition result.

The conversation manager 224 refers to the knowledge base DB 256 and the response rule DB 258 based on an input command, determines the content of a response to the occupants of the vehicle M (for example, the content of utterance to the occupants and an image and sounds output from the output). The knowledge base DB 256 is information that defines the relation between things. The response rule DB 258 is information that defines an operation (a response, details of device control, and the like) to be performed by the agent with respect to the command.

The conversation manager 224 allows the network searcher 226 to perform searching when the command requests information searchable via the network NW. The network searcher 226 accesses various web servers 300 via the network NW and acquires desired information. The "information searchable via the network NW" is, for example, evaluation results of general users for a restaurant around the vehicle M or weather information according to the position of the vehicle M on that day.

The response sentence generator 228 generates a response sentence such that the content of the utterance determined by the conversation manager 224 is transmitted to the occupants of the vehicle M, and transmits the generated response sentence (response content) to the agent device 100. The response sentence generator 228 acquires the recognition result of the occupant recognition device 80 from the agent device 100, and when the acquired recognition result identifies that an occupant who made the utterance including the command is an occupant registered in the personal profile 254, the response sentence generator 228 may call the name of the occupant or generate a response sentence in a manner of speaking similar to that of the occupant.

When the response sentence is acquired, the agent function 150 instructs the sound controller 124 to perform sound synthesis and output sounds. The agent function 150 generates an agent image in accordance with the sound output, and instructs the display controller 122 to display the generated agent image, an image included in the response content, and the like. When the response content is displayed as sounds or images, the agent function 150 performs output suitable for the profile of each occupant based on the integrated profile 172 stored in the storage 170. By so doing, the agent function in which the virtually appearing agent responds to the occupants of the vehicle M is implemented.

[Generation of Integrated Profile]

Next, the generation process of the integrated profile 172 described above will be specifically described. The personal profile acquirer 152-1 transmits the occupant recognition result recognized by the occupant recognition device 80 to the agent server 200-1 and issues a request to acquire occupant's personal profiles. The personal profile provider 212 of the agent server 200-1 refers to the feature information of the personal profile 254 by using the feature information for each occupant included in the occupant recognition result, and acquires profile information (personal information) of a corresponding occupant. FIG. 6 is a diagram illustrating an example of the content of the personal profile 254. In the personal profile 254, profile information is correlated with user IDs which are identification information for identifying users of the agent including the occupants. The profile information includes, for example, feature information, a name, an address, an age, a hobby, a preference, use history and the like. The feature information includes, for example, face feature information, sound feature information, and the like. The face feature information and the sound feature information include, for example, feature information recognizable by the occupant recognition device 80. The profile information is registered, for example, at the time of initial setting of the agent, and is appropriately updated based on an occupant change instruction, an agent use result, and the like.

The personal profile provider 212 refers to the feature information of the personal profile 254 based on the feature information included in the occupant recognition result, and acquires a personal profile including a user ID, a hobby, a preference, and use history correlated with feature information with the highest degree of similarity. The personal profile provider 212 may acquire information on a name, an address, and an age, in addition to the above information. When a user ID (occupant ID) is transmitted from the agent function 150-1, the personal profile provider 212 may refer to the user ID of the personal profile 254 and acquire at least a part of a personal profile correlated with a matching user ID. The personal profile provider 212 transmits the acquired occupant's personal profile to the agent function 150-1.

The integrated profile generator 154-1 generates the integrated profile 172 by combining at least a part of the personal profile of each occupant transmitted from the personal profile provider 212, and stores the generated integrated profile 172 in the storage 170. FIG. 7 is a diagram illustrating an example of the content of the integrated profile 172. In the integrated profile 172, for example, integrated profile information is correlated with passenger information that is information of the occupants in the vehicle M. The integrated profile information includes, for example, seating position information, an integrated hobby, an integrated preference, and integrated use history. The passenger information is information for identifying the occupants recognized by the occupant recognition device 80. In the example of FIG. 7, user IDs "U1" and "U2" are stored as the passenger information. The passenger information may be the information on the user ID included in the personal profile acquired by the personal profile acquirer 152-1, or a user ID (occupant ID) input by an occupant through the display and operation device 20 when the occupant gets on the vehicle M. The seating position information is, for example, information on a seating position of each occupant. The information on the seating position is, for example, information indicating the driver seat DS, the assistant seat AS, or the rear seats BS1 and BS2 in which occupants is sitting. In the example of FIG. 7, the seating position information stores information indicating that an occupant of the user ID "U1" (hereinafter, referred to as an occupant U1) is sitting in the driver seat DS and an occupant of the user ID "U2" (hereinafter, referred to as an occupant U2) is sitting in the assistant seat AS. The seating position information may be, for example, position information (for example, vehicle interior space coordinates) for each occupant recognized by the occupant recognition device 80.

The integrated hobby is information obtained by integrating the hobbies included in the personal profile of each occupant acquired by the personal profile acquirer 152-1. The integrated preference is information obtained by integrating the preferences included in the personal profile of each occupant acquired by the personal profile acquirer 152-1. The integrated use history is information obtained by integrating the use history included in the personal profile of each occupant acquired by the personal profile acquirer 152-1.

The integrated profile generator 154-1 sets a weight for each element when storing the integrated hobby, the integrated preference, and the integrated use history. The weight is, for example, information indicating the degree of influence on information provided to the occupants. The degree of influence is, for example, the importance of an element when the agent analyzes the meaning of the content of utterances of the occupant and executes a corresponding function or when the agent outputs response content based on the execution result of the function. In the present embodiment, for example, when the weight increases, a function that prioritizes the element is executed, or response content that prioritizes the element is output. The weight described above is set for each occupant or each function. When a common element exists in a plurality of occupants, for example, the weight is set by summation.

In the example of FIG. 7, in the integrated hobby, a hobby element <drive> corresponding to the occupant U1 and common hobby elements <music appreciation> and <dining out> of the occupants U1 and U2 are stored. Weights w1 and w2 illustrated in FIG. 7 represent weights for each element of the hobbies of the occupants U1 and U2. That is, <drive*w1> illustrated in FIG. 7 indicates that the weight w1 has been set to the hobby element of drive. The w1+w2 illustrated in FIG. 7 indicates that the weights w1 and w2 have been added.

<Setting of Weight>

Next, the setting of weights by the integrated profile generator 154-1 will be described. For example, when an agent image correlated with an activated agent is displayed on the display, the integrated profile generator 154-1 sets weights based on a displayed area.

Figure 8:
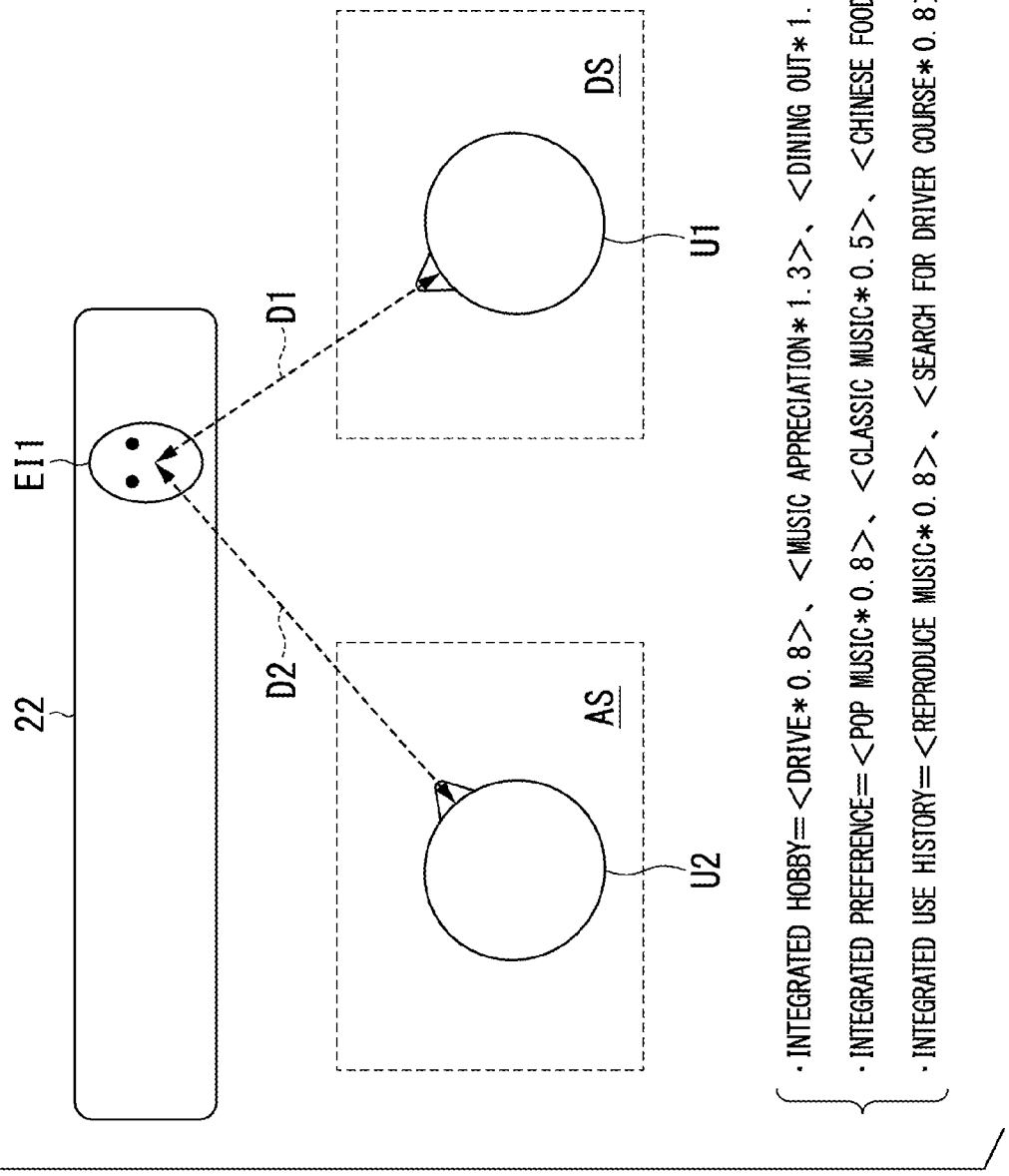
FIG. 8 is a diagram for explaining weights set by an integrated profile generator.

FIG. 8 is a diagram for explaining weights set by the integrated profile generator 154-1. In the example of FIG. 8, it is assumed that the occupant U1 is sitting in the drive seat DS of the vehicle M and the occupant U2 is sitting in the assistant seat AS. FIG. 8 illustrates the first display 22 as an example of the display; however, other displays may be used. The same applies to the following description.

In the example of FIG. 8, an agent image EI1 correlated with the activated agent 1 is displayed in the right area when viewed from the front of the first display 22. In such a case, the integrated profile generator 154-1 estimates that the agent image EI1 displayed on the first display 22 is displayed at a position visually recognizable from the occupant U1 and the occupant U2, based on the positions of the occupants U1 and U2 recognized by the occupant recognition device 80 and the display position of the agent image EI1. When the faces of the occupants U1 and U2 are directed to the display position of the agent image EI1, the integrated profile generator 154-1 may estimate that the agent image EI1 is displayed at the position visually recognizable from the occupant U1 and the occupant U2.

Then, the integrated profile generator 154-1 calculates respective distances D1 and D2 from position information of the occupants U1 and U2 (positions of the vehicle interior space coordinates) to the display position of the agent image EI1 displayed on the first display 22. Then, the integrated profile generator 154-1 sets the weight w1 to be assigned to each element of the profile of the occupant U1 and the weight w2 to be assigned to each element of the profile of the occupant U2, based on the calculated respective distances D1 and D2.

In the example of FIG. 8, the distance D1 is shorter than the distance D2. Consequently, the occupant U1 is closer to the display position of the agent image EI1 than the occupant U2. In such a case, the integrated profile generator 154-1 sets the weight w1 to be larger than the weight w2. In the example of FIG. 8, with respect to the integrated hobby, the integrated preference, and the integrated use history included in the integrated profile 172, 0.8 is set for the weight w1 of the element of the profile information of the occupant U1 and 0.5 is set for the weight w2 of the element of the profile information of the occupant U2. These values may be set based on the magnitudes of the distances D1 and D2 or a difference between the distances D1 and D2.

Here, when the display area of the agent image EI1 is moved to the left side from the display position illustrated in FIG. 8 when viewed from the front due to an occupant operation, speaker recognition, and the like, the agent image EI1 moves away from the occupant U1 and approaches the occupant U2. Consequently, the integrated profile generator 154-1 updates the weights w1 and w2 based on the distances D1 and D2 at the time point at which the display area of the agent image EI1 has been changed.

The integrated profile generator 154-1 may set the weights based on the seating positions of the occupants, instead of (or in addition to) the setting of the weights based on the display position of the agent described above. For example, the integrated profile generator 154-1 sets the weight w1 of each element of the profile of the occupant U1 sitting in the drive seat DS to be larger than the weight w2 of each element of the profile of the occupant U2 to be seated in the assistant seat AS. When occupants are sitting in the rear seats BS1 and BS2, the integrated profile generator 154-1 sets the weight of the element of the profile information of the occupant U1 to be seated in the drive seat DS to be larger than the weight of each element of the profiles of the occupants seated in the rear seats. This allows the agent 1 to execute a function and output a response result that prioritizes the profile of the occupant U1 to be seated in the drive seat DS. It is predicted that a driver will often make inquiries according to a travel route and a travel state with respect to shops around the current location, as compared with other occupants. Therefore, by increasing a weight for the driver, more appropriate information can be provided to the driver.

The integrated profile generator 154-1 may set the predetermined weight of an element of profile information of an occupant to be larger than those of other occupants. In this way, irrespective of which of the plurality of occupants speaks the content, a response result specialized for a specific occupant can be output.

The integrated profile generator 154-1 may change the proportion of profile information for each occupant included in the integrated personal information, instead of (or in addition to) changing the weight of each element of the integrated profile 172, based on the positions of the plurality of occupants and the display position of the agent image. For example, when the distance D1 between the occupant U1 and the display position of the agent image EI1 is shorter than the distance D2 between the occupant U2 and the display position of the agent image EI1, the integrated profile 172 is generated by combining the number of elements of the profile information of the occupant U1 such that the number of elements of the profile information of the occupant U1 is larger than the number of elements of the profile information of the occupant U2.

The generation of the integrated profile 172 described above is performed by the integrated profile generator 154 of the agent function 150 correlated with an activated agent whenever an agent to be activate is switched. That is, the integrated profile 172 generated by the agent 1 is controlled such that it is not available in the agent 2 or the agent 3. This allows each agent to output a unique response result. The integrated profile 172 may be used by another agent for a fee. In such a case, charging is performed based on the number of uses of the integrated profile 172 and the amount of data. The charging process may be performed by the manager 110, for example.

<Information Provision Based on Integrated Profile>

Figure 9:
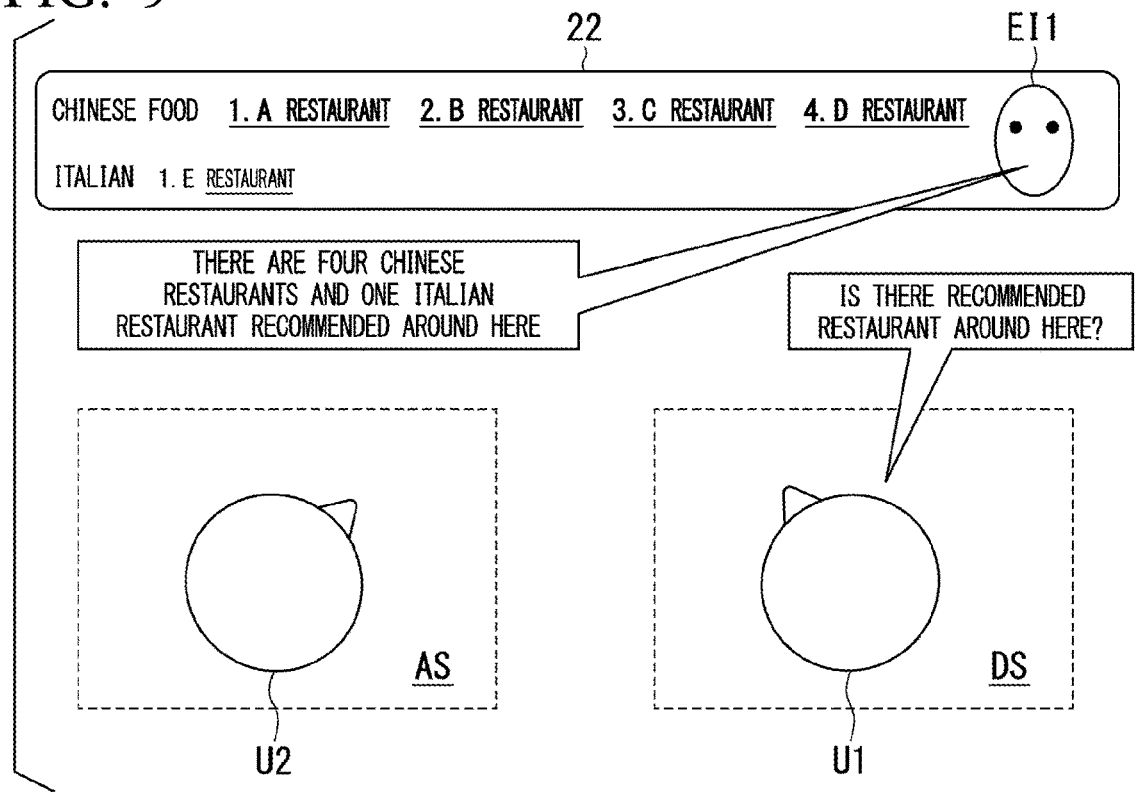
FIG. 9 is a diagram for explaining response content when an agent image is displayed at a position near an occupant U1.

Next, a manner of providing information based on the integrated profile 172 will be specifically described. Hereinafter, it is assumed that as an example of information to be provided to a plurality of occupants, information of a response result to the utterance of the occupants is used. FIG. 9 is a diagram for explaining response content when the agent image EI1 is displayed at a position near the occupant U1. In the example of FIG. 9, it is assumed that the agent 1 is activated and the occupant U1 and the occupant U2 are estimated to recognize the agent image EI1. In such a case, a larger value is set to the weight w1 of the element of the profile information of the occupant U1 included in the integrated profile 172 than the weight w2 of the element of the profile information of the occupant U2.

Here, when the utterance "Is there recommended restaurant around here?" is received from the occupant U1, the agent 1 (the agent function 150-1 and the agent server 200-1) analyzes the meaning of the sound of the utterance and searches for a nearby restaurant. In such a case, the agent 1 may narrow down the search by using some or all of the elements included in the integrated profile 172. In the example of FIG. 7, since Chinese food and Italian food are included as the elements of the integrated preference, the agent 1 adds the Chinese food and the Italian food to keywords and searches for a nearby restaurant. Next, the agent 1 generates a response sentence (response content) based on the search result, a weight of the integrated profile, and the like, and provides the generated response sentence to the occupants U1 and U2.

For example, as the weight of an element increases, the agent function 150-1 increases the number of response content to be output corresponding to the element or emphasizes the response content more than response content corresponding to another element and allows the output controller 120 to output the emphasized response content, and makes an output sequence faster. In relation to the emphasis and output, for example, in the case of display output, the response content is displayed in an emphasized color, is displayed in large characters, or is displayed with a conspicuous gradation, and in the case of sound output, the volume of the sound of the response content is set to be higher than another sound.

For example, the agent function 150-1 allows four Chinese restaurants, which are the elements of the profile information of the occupant U1, to be output and allows one Italian restaurant, which is the element of the profile information of the occupant U2, to be output, among restaurant results. In the example of FIG. 9, the agent function 150-1 allows the sound "There are four Chinese restaurants and one Italian restaurant recommended around here" to be output with a sound image localized at the display position of the agent image EI1, and allows the first display 22 to display information on the Chinese and Italian restaurants (for example, restaurant names) together with the agent image EI1. A character image for the Chinese restaurant is displayed to be larger than a character image for the Italian restaurant.

Figure 10:
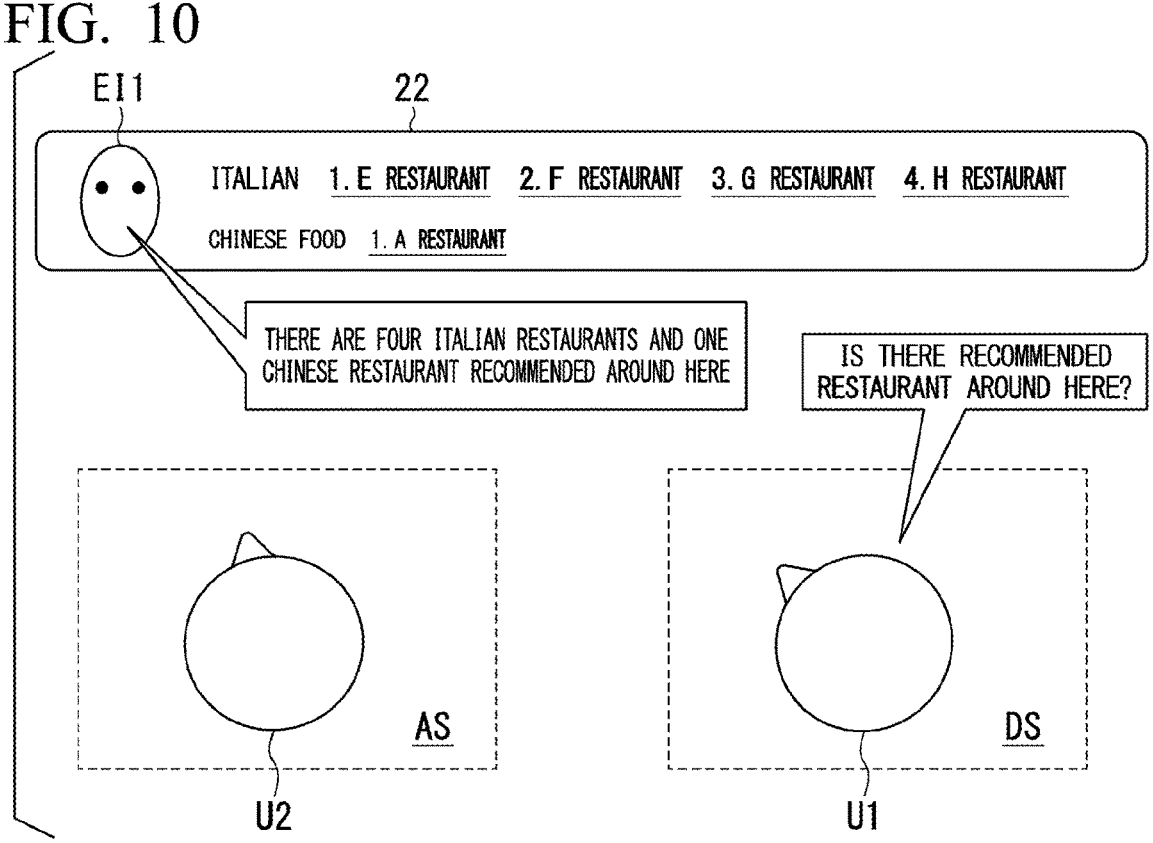
FIG. 10 is a diagram for explaining response content when an agent image is displayed at a position near an occupant U2.

FIG. 10 is a diagram for explaining response content when the agent image EI1 is displayed at a position near the occupant U2. In such a case, a larger value is set to the weight w2 of the element of the profile information of the occupant U2 included in the integrated profile 172 than the weight w1 of the element of the profile information of the occupant U1.

Consequently, the agent function 150-1 changes the content of a response result based on the weight, allows four Italian restaurants, which are the elements of the profile information of the occupant U2, to be output and allows one Chinese restaurant, which is the element of the profile information of the occupant U1, to be output, among restaurant results. In the example of FIG. 10, the agent function 150-1 allows the sound "There are four Italian restaurants and one Chinese restaurant recommended around here" to be output with a sound image localized at the display position of the agent image EI1, and allows the first display 22 to display information on the Italian and Chinese restaurants together with the agent image EI1. A character image for the Italian restaurant is displayed to be larger than a character image for the Chinese restaurant. As illustrated in FIG. 9 and FIG. 10 described above, by providing information using the integrated profile 172, it is possible to change the response result even for the same utterance content, and it is possible to provide more appropriate information to the occupants. The agent function 150-1, for example, can provide more appropriate information in providing various types of information such as reproducing occupant's favorite musical piece or searching for a recommended drive route, in addition to the restaurant search described above.

[Processing Flow]

Next, a process performed by the agent system 1 of the first embodiment will be described. The process performed by the agent system 1 is roughly classified into a process for generating an integrated profile by the agent device 100 (integrated profile generation process) and a process for providing information by using the integrated profile (information providing process). Consequently, the respective processes will be described separately below.

Figure 11:
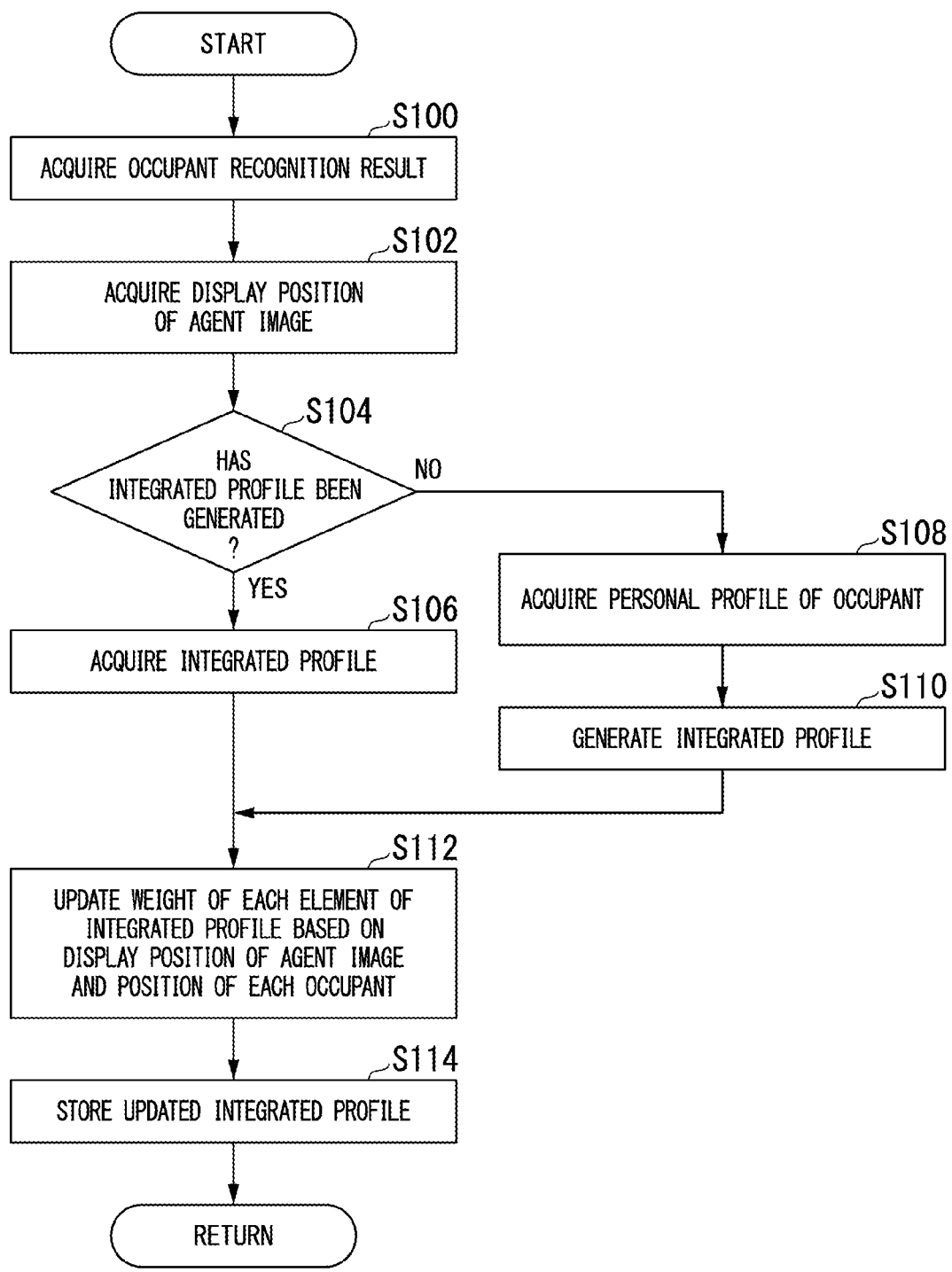
FIG. 11 is a flowchart illustrating an example of the flow of an integrated profile generation process performed by the agent device of the first embodiment.

FIG. 11 is a flowchart illustrating an example of the flow of the integrated profile generation process performed by the agent device 100 of the first embodiment. In the example of FIG. 11, it is assumed that the agent 1 has already been activated by the utterance of the wake-up word by an occupant and the agent image EI1 has been displayed in a predetermined area of the display. The process of the present flowchart may be repeatedly performed at a predetermined cycle or at a predetermined timing, for example. The predetermined timing is, for example, a timing at which the agent 1 has been activated, a timing at which the display position of the agent 1 has moved, a timing at which the recognition result of the occupant recognition device 80 has changed, or a timing at which an instruction to generate or update the integrated profile has been issued by an occupant.

First, the agent device 100 acquires the occupant recognition result of the occupant recognition device 80 (step S100). Next, the agent function 150-1 acquires the display position of the agent image EI1 displayed by the display controller 122 (step S102). Next, the integrated profile generator 154-1 determines whether an integrated profile has been generated (step S104). When it is determined that the integrated profile has been generated, the personal profile acquirer 152-1 acquires the integrated profile 172 from the storage 170 (step S106). When it is determined that the integrated profile has not been generated, the personal profile acquirer 152-1 transmits the occupant recognition result to the agent server 200-1 and acquires personal profiles of occupants in the vehicle M (step S108). Next, the integrated profile generator 154-1 generates an integrated profile by combining at least a part of the acquired personal profiles of the occupants (step S110).

After the process of step S106 or step S110, the integrated profile generator 154-1 updates the weight of each element of the integrated profile based on the display position of the agent image and the position of each occupant (step S112). Next, the integrated profile generator 154-1 stores the updated integrated profile 172 in the storage 170 (step S114). In this way, the process of the present flowchart ends.

Figure 12:
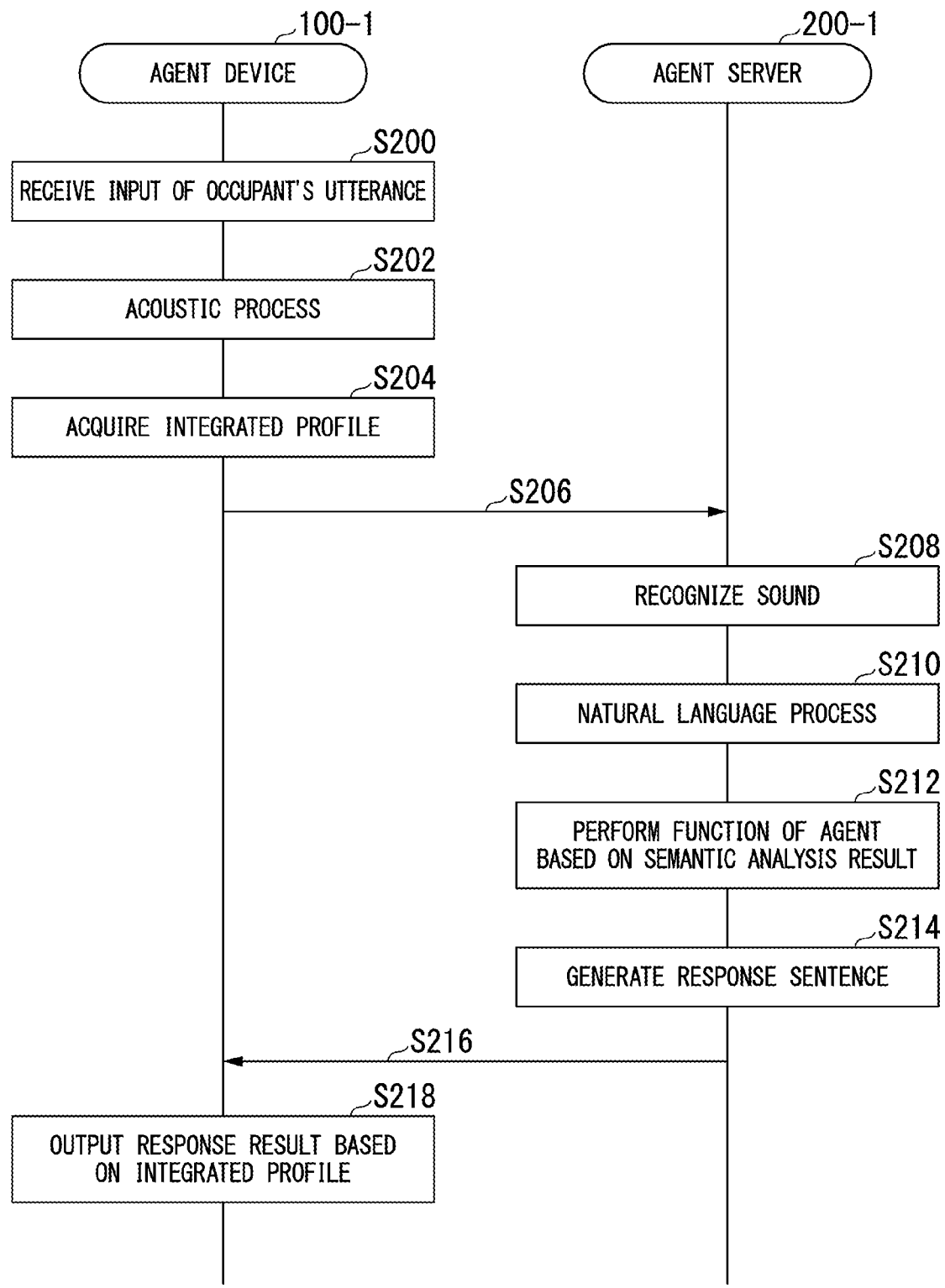
FIG. 12 is a sequence diagram illustrating an example of the flow of an information providing process performed by the agent system of the first embodiment.

FIG. 12 is a sequence diagram illustrating an example of the flow of the information providing process performed by the agent system 1 of the first embodiment. In the example illustrated in FIG. 12, it is assumed that the information providing process performed by the activated agent 1 (the agent device 100 and the agent server 200-1) will be described. In the example illustrated in FIG. 12, it is assumed that the generation or update of the integrated profile 172 has already been performed by the generation process illustrated in FIG. 11.

First, the acoustic processor 112 of the agent device 100 receives the input of occupant's utterance from the microphone 10 (step S200) and performs an acoustic process on the sound of the received utterance (step S202). Next, the agent function 150-1 acquires the integrated profile 172 stored in the storage 170 (step S204) and transmits the sound subjected to the acoustic process to the agent server 200-1 (step S206). In the process of step S206, the agent function 150-1 may transmit the integrated profile.

The sound recognizer 220 of the agent server 200-1 recognizes the sound (sound stream) subjected to the acoustic process transmitted from the agent function 150-1 and converts the sound to a text (step S208). Next, the natural language processor 222 performs a natural language process on the character information converted to the text and performs semantic analysis of the character information (step S210).

Next, the conversation manager 224 and the network searcher 226 perform the function of the agent based on the semantic analysis result (step S212). In the process of step S212, the conversation manager 224 and the network searcher 226 may perform a function based on the integrated profile transmitted from the agent function 150-1. Next, the response sentence generator 228 generates a response sentence based on the executed result (step S214) and transmits the generated response sentence to the agent device 100 (step S216).

The agent function 150-1 of the agent device 100 selects the response result transmitted from the agent server 200-1, based on the integrated profile and allows the output to output the response result (step S218).

The agent device (information providing device) 100 of the first embodiment described above includes the personal profile acquirer 152 that acquires personal profiles of a plurality of occupants in the vehicle M (an example of a moving body), a processor (the integrated profile generator 154) that generates an integrated profile by combining at least a part of the personal profiles of the plurality of occupants acquired by the personal profile acquirer 152, and an information provider (the agent function 150 and the output controller 120) that provides information to the plurality of occupants based on the integrated personal information processed by the processor, thereby providing more appropriate information to the occupants. Specifically, according to the first embodiment, when the plurality of occupants are in the vehicle M, it is possible to output a response result that prioritizes the display position of the agent and the profile information of a conversation target person.

Second Embodiment

Hereinafter, the second embodiment will be described. The agent system 1 of the second embodiment is different from the first embodiment in that the integrated profile generation process performed by the agent device 100 is performed by an agent server side and a generated integrated profile is stored in the storage 250A of the agent server 200A. Consequently, the difference described above will be mainly described below. The same components as those in the first embodiment are denoted by the same names or reference numerals and a detailed description thereof will be omitted. In the second embodiment, the agent server is an example of an information providing device.

[Agent Device]

Figure 13:
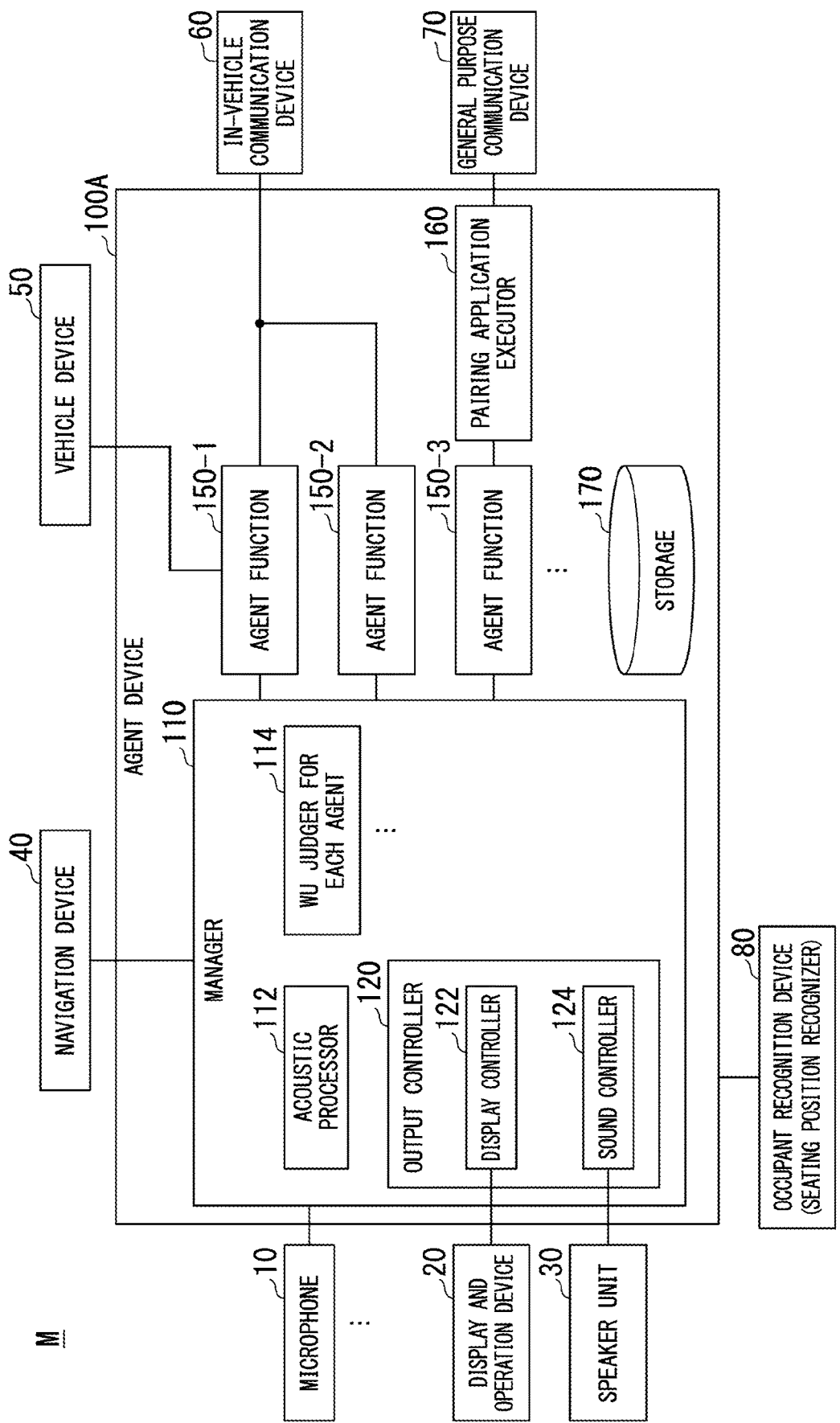
FIG. 13 is a diagram illustrating a configuration of an agent device according to a second embodiment and devices mounted on a vehicle.

FIG. 13 is a diagram illustrating a configuration of an agent device 100A according to the second embodiment and devices mounted on the vehicle M. In the vehicle M, for example, one or more microphones 10, a display and operation device 20, a speaker unit 30, a navigation device 40, a vehicle device 50, an in-vehicle communication device 60, an occupant recognition device 80, and the agent device 100A are mounted. There is a case where a general purpose communication device 70 is brought into a vehicle interior and is used as a communication device.

The agent device 100A includes a manager 110, agent functions 150A-1 to 150A-3, a pairing application executor 160, and a storage 170. The agent functions 150A-1 to 150A-3 are different from the agent functions 150-1 to 150-3 of the first embodiment described above in terms of functions in that they do not include the configurations of the personal profile acquirers 152-1 to 152-3 and the integrated profile generators 154-1 to 154-3, respectively. Consequently, each of the agent functions 150A-1 to 150A-3 performs processes other than the processes performed by the personal profile acquirers 152-1 to 152-3 and the integrated profile generators 154-1 to 154-3. The agent functions 150A-1 to 150A-3 transmit information on the occupant recognition result of the occupant recognition device 80 and the display position of the agent image to the agent server 200A-1 at a predetermined cycle or at a predetermined timing.

[Agent Server]

Figure 14:
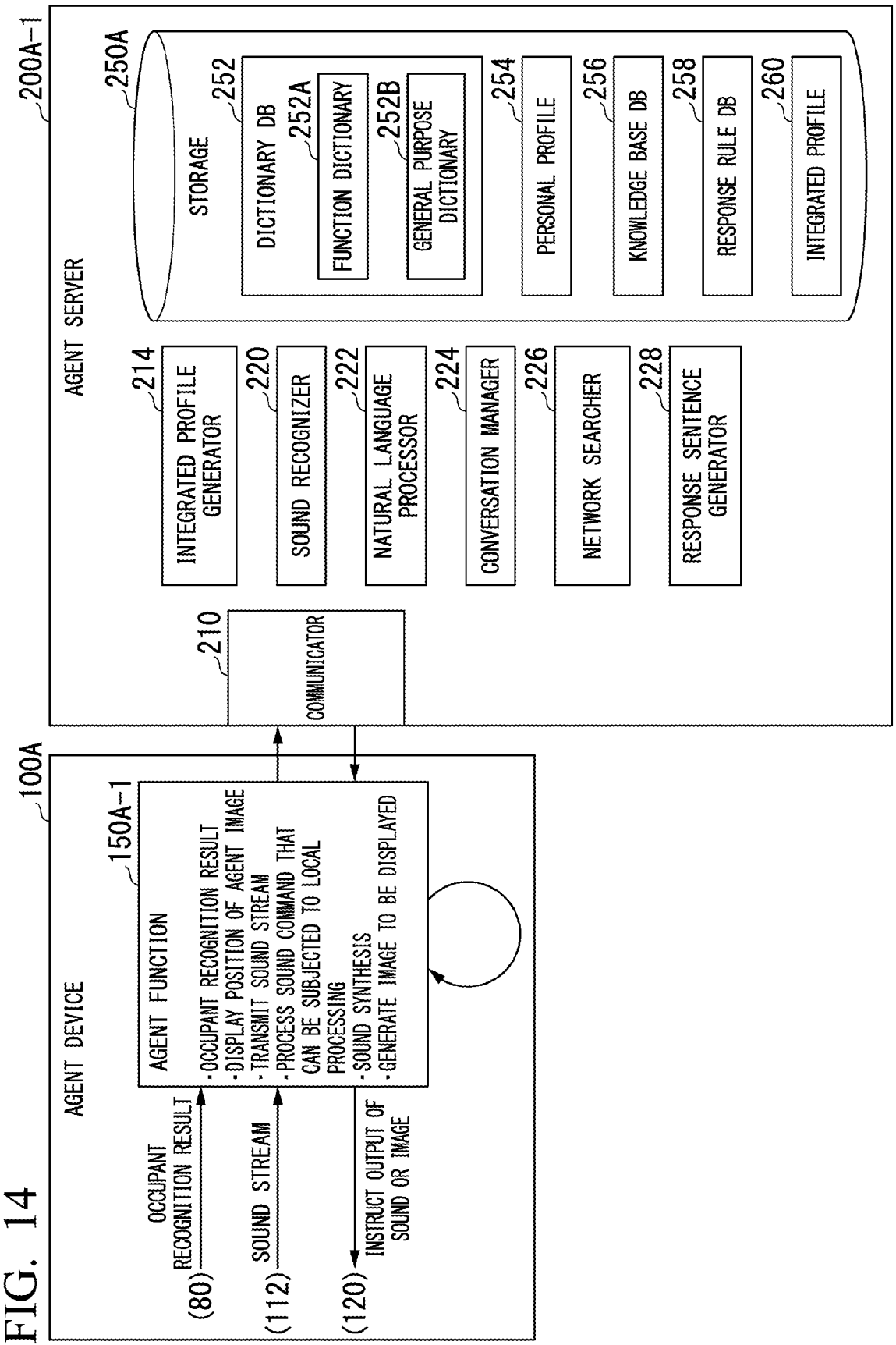
FIG. 14 is a diagram illustrating a configuration of an agent server according to the second embodiment and a part of the configuration of the agent device.

FIG. 14 is a diagram illustrating the configuration of the agent server 200A-1 according to the second embodiment and a part of the configuration of the agent device 100A. Similarly to the first embodiment, also in the second embodiment, the agent function 150A-1 is activated and a response to utterance is provided to an occupant by the agent 1 implemented by cooperation of the agent function 150A-1 and the agent server 200A-1.

The agent server 200A-1 includes a communicator 210, an integrated profile generator 214, a sound recognizer 220, a natural language processor 222, a conversation manager 224, a network searcher 226, a response sentence generator 228, and the storage 250A. These components are implemented by, for example, a hardware processor such as a CPU that executes a program (software). Some or all of these components may be implemented by hardware (a circuit unit: including circuitry) such as an LSI, an ASIC, a FPGA, and a GPU, or may be implemented by cooperation of software and hardware. The program may be stored in advance in a storage device (storage device including a non-transitory storage medium) such as an HDD and a flash memory, or may be installed in the HDD and the flash memory when a detachable storage medium (non-transitory storage medium) storing the program, such as a DVD and a CD-ROM, is mounted on a drive device. In the second embodiment, a combination of the conversation manager 224, the network searcher 226, and the response sentence generator 228 is an example of an "information provider".

The storage 250A is implemented by the aforementioned each storage device. The storage 250A stores, for example, data and programs such as a dictionary DB 252, a personal profile 254, a knowledge base DB 256, a response rule DB 258, and an integrated profile 260. The integrated profile 260 stores, for example, information on items similar to those of the integrated profile 172 of the first embodiment.

The integrated profile generator 214 refers to the personal profile 254 based on feature information for each occupant included in the occupant recognition result transmitted by the agent function 150A-1, and acquires a personal profile of each occupant. Then, the integrated profile generator 214 generates an integrated profile by combining at least a part of the acquired personal profile of each occupant. Moreover, the integrated profile generator 214 sets a weight (degree of influence) for each element, which is included in the generated integrated profile, based on the positions of the occupants and a display position of an agent image. Then, the integrated profile generator 214 stores the integrated profile 260 with the set weights in the storage 250A. For example, when there is a change in the occupant recognition result transmitted by the agent function 150A-1 or the display position of the agent image, the integrated profile generator 214 updates the integrated profile.

The information provider of the agent server 200A-1 acquires the integrated profile 260 stored in the storage 250A when performing conversation management, network search, and response sentence generation based on the semantic analysis result of sounds processed by the natural language processor 222, and changes functions to be performed by an agent and response content (response sentence) based on the acquired integrated profile 260. The information provider transmits the generated response content to the agent device 100A and provides information based on the response content to the occupants.

According to the agent system of the second embodiment described above, the agent server 200A-1 performs the generation and update of the integrated profile and the generation of response content based on the integrated profile, so that it is possible to reduce a processing load on the agent device 100A side, in addition to the same effects as those in the agent system of the first embodiment.

Each of the first embodiment and the second embodiment described above may combine some or all of other embodiments. Some or all of the functions of the agent device 100 (100A) may be included in the agent server 200 (200A-1). Some or all of the functions of the agent server 200 (200A-1) may be included in the agent device 100 (100A). That is, the separation of the functions in the agent device 100 (100A) and the agent server 200 (200A-1) may be appropriately changed by the components of each device, the scale of the agent server 200 (200A-1) and the agent system 1, and the like. The separation of the functions in the agent device 100 (100A) and the agent server 200 (200A-1) may be set for each vehicle M or each agent mounted on the vehicle.

In the embodiments described above, a vehicle is used as an example of a moving body; however, another moving body such as a ship and a flying object may be used.

Although a mode for carrying out the present invention have been described using the embodiments, the present invention is not limited to such embodiments and various modifications and replacements can be made without departing from the scope of the present invention.

What is claimed is:

1. An information providing device comprising:
an acquirer configured to acquire personal information of a plurality of occupants in a moving body;
a processor configured to generate integrated personal information by combining at least a part of the personal information of the plurality of occupants acquired by the acquirer; and
an information provider configured to provide information to the plurality of occupants based on the integrated personal information processed by the processor;
wherein the information provider further comprise:
a display controller configured to control a display to display an agent image that communicates with the plurality of occupants; and
an agent functional unit configured to provide a service including allowing an output to output a sound response according to sounds of the plurality of occupants,
wherein the processor changes a degree of influence of the personal information of the occupants included in the integrated personal information based on a display position of the agent image and respective positions of the plurality of occupants in the moving body.

2. The information providing device according to claim 1, wherein the processor combines at least a part of the personal information of the plurality of occupants based on an area of the display where the agent image is displayed.

3. The information providing device according to claim 1, wherein the processor increases the degree of influence of the personal information of the occupants included in the integrated personal information with respect to an occupant located at a position near the display position of the agent image among the plurality of occupants.

4. The information providing device according to claim 1, wherein the processor increases the degree of influence of the personal information of the occupants included in the integrated personal information with respect to an occupant located at a position near the display position of the agent image among the plurality of occupants.

5. The information providing device according to claim 1, wherein the processor changes a ratio of the personal information of the occupants included in the integrated personal information based on the display position of the agent image and respective positions of the plurality of occupants in the moving body.

6. The information providing device according to claim 2, wherein the display has a display area large enough for two or more of the plurality of occupants to recognize that the agent image is displayed at a position facing the two or more occupants.

7. An information providing method comprising:
acquiring, by an information providing device, personal information of a plurality of occupants in a moving body;
generating, by the information providing device, integrated personal information by combining at least a part of the acquired personal information of the plurality of occupants;
providing, by the information providing device, information to the plurality of occupants based on the generated integrated personal information;
controlling, by the information providing device, a display to display an agent image that communicates with the plurality of occupants;
providing, by the information providing device, a service including allowing an output to output a sound response according to sounds of the plurality of occupants; and
changing, by the information providing device, a degree of influence of the personal information of the occupants included in the integrated personal information based on a display position of the agent image and respective positions of the plurality of occupants in the moving body.

8. An information providing device comprising:
an acquirer configured to acquire personal information of a plurality of occupants in a moving body;
a processor configured to generate integrated personal information by combining at least a part of the personal information of the plurality of occupants acquired by the acquirer; and
an information provider configured to provide information to the plurality of occupants based on the integrated personal information processed by the processor;
wherein the information provider further comprises:
   a display controller configured to control a display to display an agent image that communicates with the plurality of occupants; and
   an agent functional unit configured to provide a service including allowing an output to output a sound response according to sounds of the plurality of occupants,
   wherein the display has a display area large enough for two or more of the plurality of occupants to recognize that the agent image is displayed at a position facing the two or more occupants.

9. An information providing method comprising:
acquiring, by an information providing device, personal information of a plurality of occupants in a moving body;
generating, by the information providing device, integrated personal information by combining at least a part of the personal information of the plurality of occupants;
providing, by the information providing device, information to the plurality of occupants based on the integrated personal information;
controlling, by the information providing device, a display to display an agent image that communicates with the plurality of occupants; and
providing, by the information providing device, a service including allowing an output to output a sound response according to sounds of the plurality of occupants,
wherein the display has a display area large enough for two or more of the plurality of occupants to recognize that the agent image is displayed at a position facing the two or more occupants.

* * * * *